(12) United States Patent
Piernot et al.

(10) Patent No.: US 10,373,617 B2
(45) Date of Patent: Aug. 6, 2019

(54) REDUCING THE NEED FOR MANUAL START/END-POINTING AND TRIGGER PHRASES

(71) Applicant: Apple Inc., Cupertino, CA (US)

(72) Inventors: Philippe P. Piernot, Palo Alto, CA (US); Justin Binder, Oakland, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/656,793

(22) Filed: Jul. 21, 2017

(65) Prior Publication Data

US 2018/0012596 A1    Jan. 11, 2018

Related U.S. Application Data

(63) Continuation of application No. 14/502,737, filed on Sep. 30, 2014, now Pat. No. 9,715,875.

(Continued)

(51) Int. Cl.
*G10L 15/22* (2006.01)
*G06F 3/01* (2006.01)
(Continued)

(52) U.S. Cl.
CPC ............... *G10L 15/22* (2013.01); *G06F 3/013* (2013.01); *G06F 3/167* (2013.01); *G10L 15/26* (2013.01);
(Continued)

(58) Field of Classification Search
CPC ................................. G10L 15/22; G06F 3/013
See application file for complete search history.

(56) References Cited

U.S. PATENT DOCUMENTS 6,816,836 B2    11/2004   Basu et al.
2004/0135701 A1   7/2004   Yasuda et al.
(Continued)

FOREIGN PATENT DOCUMENTS

CN        101281745 A     10/2008
CN        102629246 A      8/2012
(Continued)

OTHER PUBLICATIONS

Decision to Grant for European Patent Application No. 15169349.6, dated Mar. 8, 2018, 2 pages.
(Continued)

*Primary Examiner* — Ibrahim Siddo
(74) *Attorney, Agent, or Firm* — Dentons US LLP

(57) ABSTRACT

Systems and processes for selectively processing and responding to a spoken user input are provided. In one example, audio input containing a spoken user input can be received at a user device. The spoken user input can be identified from the audio input by identifying start and end-points of the spoken user input. It can be determined whether or not the spoken user input was intended for a virtual assistant based on contextual information. The determination can be made using a rule-based system or a probabilistic system. If it is determined that the spoken user input was intended for the virtual assistant, the spoken user input can be processed and an appropriate response can be generated. If it is instead determined that the spoken user input was not intended for the virtual assistant, the spoken user input can be ignored and/or no response can be generated.

73 Claims, 5 Drawing Sheets

Related U.S. Application Data

(60) Provisional application No. 62/005,760, filed on May 30, 2014.

(51) Int. Cl.

| | | |
|---|---|---|
| *G10L 15/26* | (2006.01) | |
| *H04W 4/02* | (2018.01) | |
| *G06F 3/16* | (2006.01) | |
| *G10L 15/18* | (2013.01) | |
| *G10L 17/00* | (2013.01) | |

(52) U.S. Cl.
CPC ..... *H04W 4/025* (2013.01); *G06F 2203/0381* (2013.01); *G10L 15/1815* (2013.01); *G10L 15/1822* (2013.01); *G10L 17/00* (2013.01); *G10L 2015/223* (2013.01); *G10L 2015/227* (2013.01); *G10L 2015/228* (2013.01)

(56) References Cited

U.S. PATENT DOCUMENTS

| | | | |
|---|---|---|---|
| 2004/0135774 | A1 | 7/2004 | La Monica |
| 2004/0136510 | A1 | 7/2004 | Vander Veen |
| 2004/0138869 | A1 | 7/2004 | Heinecke |
| 2004/0145607 | A1 | 7/2004 | Alderson |
| 2004/0153306 | A1 | 8/2004 | Tanner et al. |
| 2004/0160419 | A1 | 8/2004 | Padgitt |
| 2004/0162741 | A1 | 8/2004 | Flaxer et al. |
| 2004/0174399 | A1 | 9/2004 | Wu et al. |
| 2004/0174434 | A1 | 9/2004 | Walker et al. |
| 2004/0176958 | A1 | 9/2004 | Saimenkaita et al. |
| 2004/0177319 | A1 | 9/2004 | Horn |
| 2007/0043687 | A1* | 2/2007 | Bodart .............. G06Q 10/107 |
| 2013/0300648 | A1* | 11/2013 | Kim ..................... G06F 3/011 345/156 |
| 2014/0278435 | A1* | 9/2014 | Ganong, III ........... G10L 15/22 704/275 |

FOREIGN PATENT DOCUMENTS

| | | |
|---|---|---|
| JP | 59-35234 A | 2/1984 |
| JP | 2005-80094 A | 3/2005 |
| JP | 2005-149481 A | 6/2005 |
| JP | 2005-157965 A | 6/2005 |
| JP | 2005-210362 A | 8/2005 |
| JP | 2005-228075 A | 8/2005 |
| JP | 2005-275925 A | 10/2005 |
| JP | 2005-332212 A | 12/2005 |
| JP | 2006-003142 A | 1/2006 |
| JP | 2006-4274 A | 1/2006 |
| JP | 2006-5655 A | 1/2006 |
| JP | 2006-30447 A | 2/2006 |
| JP | 2006-31092 A | 2/2006 |
| JP | 2006-59094 A | 3/2006 |
| JP | 2006-80617 A | 3/2006 |

OTHER PUBLICATIONS

Final Office Action for U.S. Appl. No. 14/502,737, dated Dec. 12, 2016, 13 pages.
Intention to Grant for European Patent Application No. 15169349.6, dated Oct. 16, 2017, 7 pages.
Non-Final Office Action for U.S. Appl. No. 14/502,737, dated Jun. 15, 2016, 11 pages.
Notice of Acceptance for Australian Patent Application No. 2015202943, dated Apr. 20, 2017, 3 pages.
Notice of Allowance for Japanese Patent Application No. 2015-109087, dated Mar. 30, 2018, 4 pages (1 page of English Translation and 3 pages of Official copy).
Notice of Allowance for Korean Patent Application No. 10-2015-76599, dated Jan. 26, 2017, 3 pages (1 page of English Translation and 2 pages of Official Copy).
Notice of Allowance for Taiwanese Patent application No. 104117237, dated Mar. 10, 2017, 3 pages (Official Copy only) (See Communication under 37 CFR § 1.98(a) (3)).
Notice of Allowance for U.S. Appl. No. 14/502,737, dated Apr. 7, 2017, 30 pages.
Notice of Allowance for U.S. Appl. No. 14/502,737, dated Jun. 8, 2017, 2 pages.
Office Action for Australian Patent Application No. 2015202943, dated Apr. 27, 2016, 3 pages.
Office Action for Australian Patent Application No. 2015202943, dated Oct. 31, 2016, 3 pages.
Office Action for European Patent Application No. 15169349.6, dated Jul. 27, 2017, 5 pages.
Office Action for European Patent Application No. 15169349.6, dated Sep. 26, 2016, 5 pages.
Office Action for Japanese Patent Application No. 2015-109087, dated Sep. 19, 2017, 14 pages (6 pages of English Translation and 8 pages of Official Copy).
Office Action for Japanese Patent Application No. 2015-109087, dated Sep. 23, 2016, 14 pages (7 pages of English Translation and 7 pages of Official Copy).
Office Action for Korean Patent Application No. 10-2015-76599, dated Jun. 10, 2016, 9 pages (4 pages of English Translation and 5 pages of official copy).
Office Action for Taiwanese Patent Application No. 104117237, dated Jul. 11, 2016, 17 pages (7 pages of English Translation and 10 pages of Official Copy.
Office Action for Chinese Patent Application No. 201510289544.9, dated May 3, 2018, 27 pages (16 pages of English Translation and 11 pages of Official Copy).
Office Action for Chinese Patent Application No. 201510289544.9, dated Nov. 19, 2018, 10 pages (6 pages of English Translation and 4 pages of Official Copy).
Extended European Search Report for European Patent Application No. 17210705.4, dated Feb. 6, 2018, 12 pages.
Office Action received for European Patent Application No. 17210705.4, dated Mar. 5, 2019, 5 Pages.

\* cited by examiner

REDUCING THE NEED FOR MANUAL START/END-POINTING AND TRIGGER PHRASES

CROSS-REFERENCE TO RELATED APPLICATION

This application is a Continuation Application of U.S. patent application Ser. No. 14/502,737, entitled REDUCING THE NEED FOR MANUAL START/END-POINTING AND TRIGGER PHRASES, filed on Sep. 30, 2014 (now U.S. Pat. No. 9,715,875), which claims priority to U.S. Provisional Ser. No. 62/005,760, filed on May 30, 2014, entitled REDUCING THE NEED FOR MANUAL START/END-POINTING AND TRIGGER PHRASES, both of which are hereby incorporated by reference in their entirety for all purposes.

FIELD

This relates generally to speech processing and, more specifically, to the selective processing of spoken user inputs using contextual data.

BACKGROUND

Intelligent automated assistants (or virtual assistants) provide an intuitive interface between users and electronic devices. These assistants can allow users to interact with devices or systems using natural language in spoken and/or text forms. For example, a user can access the services of an electronic device by providing a spoken user input to a virtual assistant associated with the electronic device. The virtual assistant can interpret the user's intent from the spoken user input and operationalize the user's intent into tasks. The tasks can then be performed by executing one or more functions of the electronic device and a relevant output can be returned to the user in natural language form.

In order for a virtual assistant to properly process and respond to a spoken user input, the virtual assistant can first identify the beginning and end of the spoken user input within a stream of audio input using processes typically referred to as start-pointing and end-pointing, respectively. Conventional virtual assistants can identify these points based on energy levels and/or acoustic characteristics of the received audio stream or manual identification by the user. For example, some virtual assistants can require users to input a start-point identifier by pressing a physical or virtual button before speaking to the virtual assistant or by uttering a specific trigger phrase before speaking to the virtual assistant in natural language form. In response to receiving one of these start-point identifiers, the virtual assistant can interpret subsequently received audio as being the spoken user input. While these techniques can be used to clearly identify spoken user input that is directed at the virtual assistant, interacting with the virtual assistant in this way can be unnatural or difficult for the user. For example, in a back-and-forth conversation between the virtual assistant and the user, the user can be required to input the start-point identifier (e.g., pressing a button or repeating the same trigger phrase) before each spoken user input.

SUMMARY

Systems and processes for operating a virtual assistant are disclosed. One example process can include receiving, at an electronic device, an audio input, monitoring the audio input to identify a first spoken user input, identifying the first spoken user input in the audio input, and determining whether to respond to the first spoken user input based on contextual information associated with the first spoken user input. The process can further include, in response to a determination to respond to the first spoken user input: generating a response to the first spoken user input; and monitoring the audio input to identify a second spoken user input. The process can further include, in response to a determination not to respond to the first spoken user input, monitoring the audio input to identify the second spoken user input without generating the response to the first spoken user input.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to systems and processes for selectively processing and responding to a spoken user input. In one example process, audio input that includes a spoken user input can be received at a user device. The spoken user input can be identified from the audio input by identify a start-point and an end-point of the spoken user input. It can be determined whether or not the spoken user input was intended for a virtual assistant running on the user device and whether the virtual assistant should respond to the spoken user input based on contextual information. The determination can be made using a rule-based system or a probabilistic (e.g., machine learning) system. If it is determined that the spoken user input was intended for the virtual assistant and that the virtual assistant should respond to the spoken user input, the spoken user input can be processed and an appropriate response can be generated. If it is instead determined that the spoken user input was not intended for the virtual assistant, the spoken user input can be ignored and/or no response can be generated. Using contextual information to determine whether or not a spoken user input was intended for the virtual assistant can advantageously allow a user to interact with the virtual assistant without having to manually identify a start-point (e.g., by pressing a button or uttering a trigger phrase) before each spoken user input.

System Overview

Figure 1:
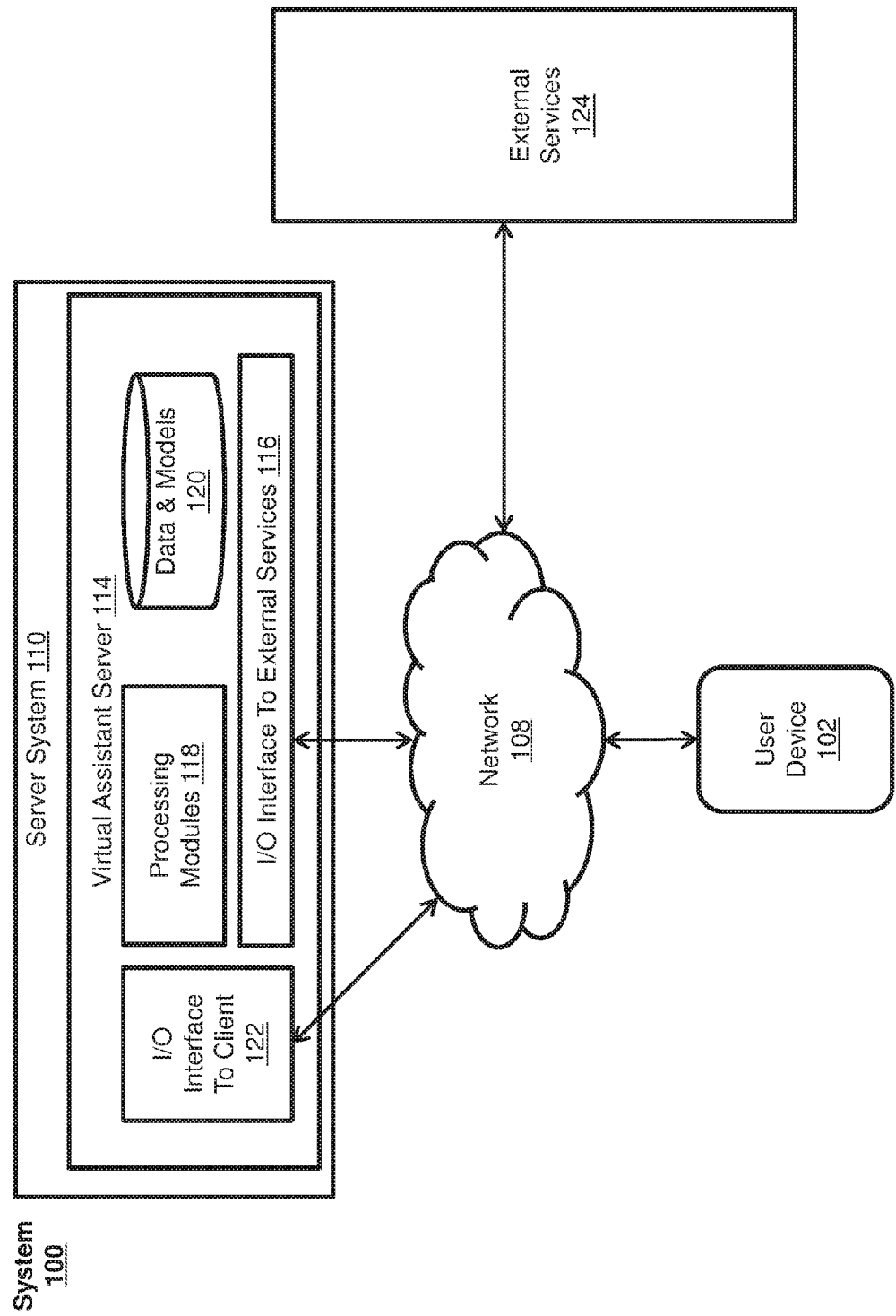
FIG. 1 illustrates an exemplary environment in which a virtual assistant operate according to various examples.

FIG. 1 illustrates exemplary system 100 for implementing a virtual assistant according to various examples. The terms "virtual assistant," "digital assistant," "intelligent automated assistant," or "automatic digital assistant," can refer to any information processing system that interprets natural language input in spoken and/or textual form to infer user intent, and performs actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., speech) and/or visual form.

A virtual assistant can be capable of accepting a user request at least partially in the form of a natural language command, request, statement, narrative, and/or inquiry. Typically, the user request seeks either an informational answer or performance of a task by the virtual assistant. A satisfactory response to the user request can include either provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 PM today." In response, the virtual assistant can acknowledge the request and then create an appropriate reminder item in the user's electronic schedule. During performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.) and possibly using multiple devices (e.g., output text to speech via a phone headset and display text on a TV).

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 1, in some examples, a virtual assistant can be implemented according to a client-server model. The virtual assistant can include a client-side portion executed on a user device 102, and a server-side portion executed on a server system 110. User device 102 can include any electronic device, such as a mobile phone, tablet computer, portable media player, desktop computer, laptop computer, PDA, television, television set-top box, wearable electronic device, or the like, and can communicate with server system 110 through one or more networks 108, which can include the Internet, an intranet, or any other wired or wireless public or private network. The client-side portion executed on user device 102 can provide client-side functionalities, such as user-facing input and output processing and communications with server system 110. Server system 110 can provide server-side functionalities for any number of clients residing on a respective user device 102.

Server system 110 can include one or more virtual assistant servers 114 that can include a client-facing I/O interface 122, one or more processing modules 118, data and model storage 120, and an I/O interface to external services 116. The client-facing I/O interface 122 can facilitate the client-facing input and output processing for virtual assistant server 114. The one or more processing modules 118 can utilize data and model storage 120 to determine the user's intent based on natural language input and perform task execution based on inferred user intent. In some examples, virtual assistant server 114 can communicate with external services 124, such as telephony services, calendar services, information services, messaging services, navigation services, and the like, through network(s) 108 for task completion or information acquisition. The I/O interface to external services 116 can facilitate such communications.

Server system 110 can be implemented on one or more standalone data processing devices or a distributed network of computers. In some examples, server system 110 can employ various virtual devices and/or services of third party service providers (e.g., third-party cloud service providers to provide the underlying computing resources and/or infrastructure resources of server system 110.

Although the functionality of the virtual assistant is shown in FIG. 1 as including both a client-side portion and a server-side portion, in some examples, the functions of a the assistant can be implemented as a standalone application installed on a user device. In addition, the division of functionalities between the client and server portions of the virtual assistant can vary in different examples. For instance, in some examples, the client executed on user device 102 can be a thin-client that provides only user-facing input and output processing functions, and delegates all other functionalities of the virtual assistant to a backend server.

User Device

Figure 2:
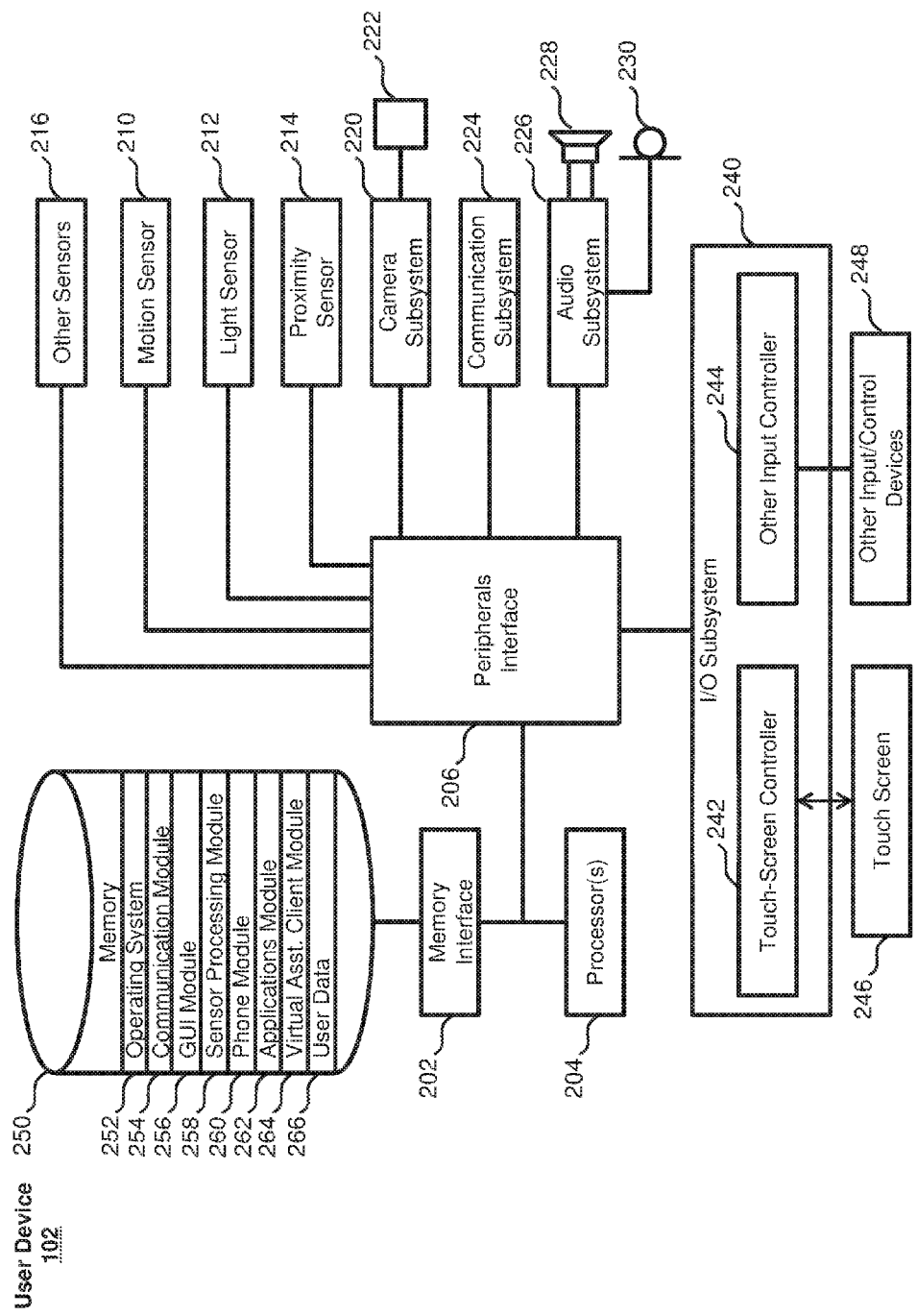
FIG. 2 illustrates an exemplary user device according to various examples.

FIG. 2 is a block diagram of a user-device 102 according to various examples. As shown, user device 102 can include a memory interface 202, one or more processors 204, and a peripherals interface 206. The various components in user device 104 can be together coupled by one or more communication buses or signal lines. User device 102 can further include various sensors, subsystems, and peripheral devices that are coupled to the peripherals interface 206. The sensors, subsystems, and peripheral devices gather information and/or facilitate various functionalities of user device 102.

For example, user device 102 can include a motion sensor 210, a light sensor 212, and a proximity sensor 214 coupled to peripherals interface 206 to facilitate orientation, light, and proximity sensing functions. One or more other sensors 216, such as a positioning system (e.g., a GPS receiver), a temperature sensor, a biometric sensor, a gyroscope, a compass, an accelerometer, and the like, are also connected to peripherals interface 206, to facilitate related functionalities.

In some examples, a camera subsystem 220 and an optical sensor 222 can be utilized to facilitate camera functions, such as taking photographs and recording video clips. Communication functions can be facilitated through one or more wired and/or wireless communication subsystems 224, which can include various communication ports, radio frequency receivers and transmitters, and/or optical (e.g., infrared) receivers and transmitters. An audio subsystem 226 can be coupled to speakers 228 and a microphone 230 to facilitate voice-enabled functions, such as voice recognition, voice replication, digital recording, and telephony functions.

In some examples, user device 102 can further include an I/O subsystem 240 coupled to peripherals interface 206. I/O subsystem 240 can include a touch screen controller 242 and/or other input controller(s) 244. Touch-screen controller 242 can be coupled to a touch screen 246. Touch screen 246 and the touch screen controller 242 can, for example, detect contact and movement or break thereof using any of a plurality of touch sensitivity technologies, such as capacitive, resistive, infrared, surface acoustic wave technologies, proximity sensor arrays, and the like. Other input controller(s) 244 can be coupled to other input/control devices 248, such as one or more buttons, rocker switches, a thumb-wheel, an infrared port, a USB port, and/or a pointer device such as a stylus.

In some examples, user device 102 can further include a memory interface 202 coupled to memory 250. Memory 250 can include any electronic, magnetic, optical, electromagnetic, infrared, or semiconductor system, apparatus, or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, or flash memory such as compact flash cards, secured digital cards, USB memory devices, memory sticks, and the like. In some examples, a non-transitory computer-readable storage medium of memory 250 can be used to store instructions (e.g., for performing process 300 and/or 400, described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing process 300 and/or 400, described below) can be stored on a non-transitory computer-readable storage medium of server system 110, or can be divided between the non-transitory computer-readable storage medium of memory 250 and the non-transitory computer-readable storage medium of server system 110. In the context of this document, a "non-transitory computer readable storage medium" can be any medium that can contain or store the program for use by or in connection with the instruction execution system, apparatus, or device.

In some examples, the memory 250 can store an operating system 252, a communication module 254, a graphical user interface module 256, a sensor processing module 258, a phone module 260, and applications module 262. Operating system 252 can include instructions for handling basic system services and for performing hardware dependent tasks. Communication module 254 can facilitate communicating with one or more additional devices, one or more computers and/or one or more servers. Graphical user interface module 256 can facilitate graphic user interface processing. Sensor processing module 258 can facilitate sensor related processing and functions. Phone module 260 can facilitate phone-related processes and functions. Applications module 262 can facilitate various functionalities of user applications, such as electronic-messaging, web browsing, media processing, navigation, imaging and/or other processes and functions.

As described herein, memory 250 can also store client-side virtual assistant instructions (e.g., in a virtual assistant client module 264) and various user data 266 (e.g., user-specific vocabulary data, preference data, and/or other data such as the user's electronic address book, to-do lists, shopping lists, etc.) to provide the client-side functionalities of the virtual assistant.

In various examples, virtual assistant client module 264 can be capable of accepting voice input (e.g., speech input), text input, touch input, and/or gestural input through various user interfaces (e.g., I/O subsystem 240, audio subsystem 226, or the like) of user device 104. Virtual assistant client module 264 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 264 can communicate with the virtual assistant server using communication subsystems 224. Additionally, virtual assistant client module 264 can communicate with other devices, such as home automation equipment, and can thus have a physical effect on the physical world (e.g., unlocking a door) or can be embedded in such devices.

In some examples, virtual assistant client module 264 can utilize the various sensors, subsystems, and peripheral devices to gather additional information from the surrounding environment of user device 102 to establish a context associated with a user, the current user interaction, and/or the current user input. In some examples, virtual assistant client module 264 can provide the contextual information or a subset thereof with the user input to the virtual assistant server to help infer the user's intent. The virtual assistant can also use the contextual information to determine how to prepare and deliver outputs to the user. As discussed in greater detail below, the contextual information can further be used by user device 102 or server system 110 to determine whether or not a spoken user input is intended for the virtual assistant and to determine an appropriate response.

In some examples, the contextual information that accompanies the user input can include sensor information, such as lighting, ambient noise, ambient temperature, images or videos of the surrounding environment, distance to another object, and the like. The contextual information can further include information associated with the physical state of user device 102 (e.g., device orientation, device location, device temperature, power level, speed, acceleration, motion patterns, cellular signals strength, etc.) or the software state of user device 102 (e.g., running processes, installed programs, past and present network activities, background services, error logs, resources usage, front-most application, etc.). Any of these types of contextual information can be provided to the virtual assistant server as contextual information associated with a user input. Additionally, the contextual information can further include biometric user data, such as heart rate, hand temperature, voice quality, facial expression, etc.

In some examples, virtual assistant client module 264 can selectively provide information (e.g., user data 266) stored on user device 102 in response to requests from the virtual assistant server. Virtual assistant client module 264 can also elicit additional input from the user via a natural language dialogue or other user interfaces upon request by virtual assistant server 114. Virtual assistant client module 264 can pass the additional input to virtual assistant server 114 to help virtual assistant server 114 in intent inference and/or fulfillment of the user's intent expressed in the user request.

In various examples, memory 250 can include additional instructions or fewer instructions. Furthermore, various functions of user device 102 can be implemented in hardware and/or in firmware, including in one or more signal processing and/or application specific integrated circuits.

Processes for Operating the Virtual Assistant

Figure 3:
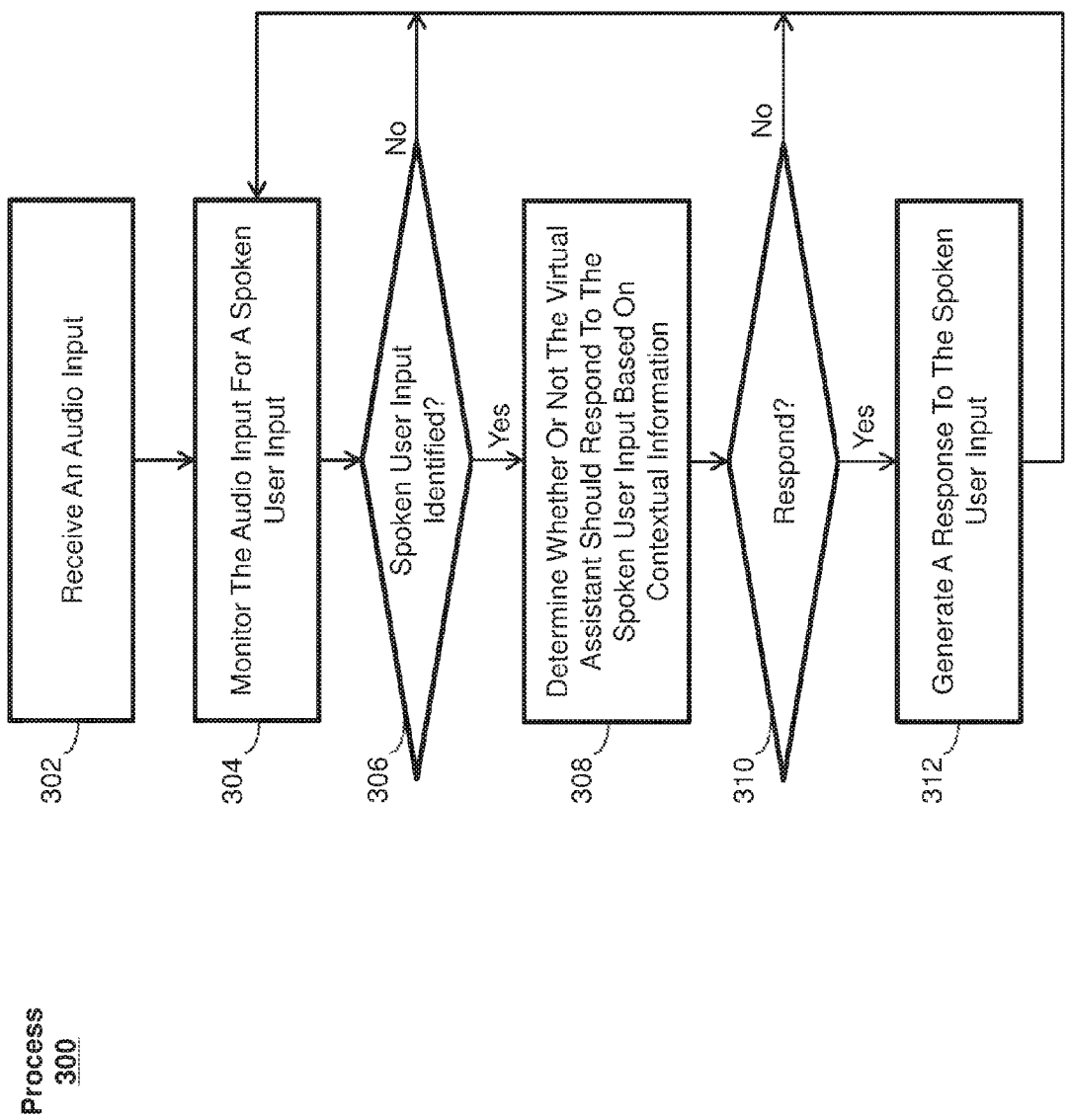
FIG. 3 illustrates an exemplary process for selectively processing and responding to a spoken user input using contextual information according to various examples.

FIG. 3 illustrates an exemplary process 300 that can be performed to selectively process and respond to a user input (e.g., a spoken user input) using contextual information according to various examples. In some examples, process 300 can be performed using a system similar or identical to system 100, shown in FIG. 1.

At block 302, an audio input can be received at a user device. The audio input can include any detectable sound, such as music, a user's voice, background noise, a combination thereof, or the like. In some examples, a user device (e.g., user device 102) can receive audio input that includes a user's natural language speech via a microphone (e.g., microphone 230). The microphone can convert the audio input into an analog or digital representation and provide the audio data to one or more processors (e.g., processor(s) 204). While shown as being discrete from the other blocks of process 300, it should be appreciated that, in some examples, audio input can continue to be received at block 302 while some or all of the other blocks of process 300 are being performed.

At block 304, the audio input received at block 302 can be monitored to identify a segment of the audio input that includes or potentially includes a spoken user input. In some examples, this can include monitoring one or more characteristics of the audio input to identify a start-point and an end-point of the spoken user input within the audio input. The start and end-points can be identified using any known start/end-pointing algorithm, such as those relying on energy features of the audio input (e.g., short-time energy and zero-crossing rate) to distinguish user speech from background noise in the audio input. In some examples, the processor(s) of the user device can analyze the energy of the audio data received from the device's microphone to identify segments of the audio input that are sufficiently high in energy and have zero-crossing rates characteristic of user speech. In other examples, the user device can transmit the audio data to a remote server (e.g., virtual assistant server 114) capable of determining the start and end-points of the spoken user input.

In some examples, block 304 can further include performing a speech-to-text conversion operation on the detected spoken user input either locally on the device or by transmitting the audio data to a remote server capable of such an operation. In other examples, block 304 may not include performing a speech-to-text conversion operation. Instead, the speech-to-text conversion operation can be performed at block 312 after determining that the virtual assistant should respond to the spoken user input at block 308.

At block 306, it can be determined whether or not a spoken user input was identified while monitoring the audio input at block 304. If no spoken user input was identified, the process can return to block 304. If, however, a spoken user input was identified, the process can proceed to block 308.

At block 308, it can be determined whether or not the virtual assistant should respond to the spoken user input by determining whether or not the spoken user input identified at block 304 was intended for the virtual assistant (e.g., the user directed the spoken user input at the virtual assistant and expects the virtual assistant to perform a task or provide a response based on the spoken user input) based on contextual information. Various example sources of contextual information that can be used at block 308 to determine whether or not the spoken user input was intended for the virtual assistant are described below. Block 308 can be performed by the user device, a remote server (e.g., virtual assistant server 114), or a combination thereof.

In some examples, a probabilistic system can be used to determine whether or not the virtual assistant should respond to the spoken user input by determining a likelihood or confidence score that the user intended for the spoken user input to be directed at the virtual assistant. The probabilistic system can include a machine learning system or classifiers, such as neural networks. Additionally, the probabilistic system can learn and adapt to the user using a feedback loop. In these probabilistic system examples, the likelihood or confidence score can include a numerical or other representation of a calculated probability that the user intended for the spoken user input to be directed at the virtual assistant. The calculated likelihood or confidence score can then be compared to a threshold value to determine whether or not the virtual assistant should respond to the spoken user input. For example, if the calculated likelihood or confidence score is greater than the threshold value, it can be determined that the spoken user input was intended for the virtual assistant. If, however, the calculated likelihood or confidence score is not greater than the threshold value, it can be determined that the spoken user input was not intended for the virtual assistant.

The likelihood or confidence score can be determined in any number of ways. For example, the determination can generally include summing positive, negative, and/or neutral contributions from any number of different types of contextual information. For example, the likelihood or confidence score can be calculated using the general formula of $P = C_1 + C_2 + C_3 + \ldots + C_N$, where P represents the likelihood or confidence score that the spoken user input was intended for the user device and $C_1 \ldots C_N$ can be positive, negative, or zero values representing the positive, negative, or neutral contributions to the likelihood or confidence score from the N different types of contextual information. A positive contribution can represent a type of contextual information that suggests that the spoken user input was intended for the virtual assistant, a negative contribution can represent a type of contextual information that suggests that the spoken user input was not intended for the virtual assistant, and a neutral contribution can represent a type of contextual information that is neutral regarding the likelihood that the spoken user input was intended for the virtual assistant. Thus, a large P value can indicate that the spoken user input was likely intended for the virtual assistant, while small or negative P values can indicate that the spoken user input was likely not intended for the virtual assistant. The weight or value that each contextual information contribution adds to the likelihood or confidence score determination can be uniform or non-uniform. Additionally, the weight or value that each contribution adds to the likelihood or confidence score determination can depend on the value of the particular type of contextual information. For example, if contribution $C_1$ depends on the volume of the user's voice, the sign (e.g., +/−) and/or magnitude of $C_1$ can depend on a numerical representation of the volume of the user's voice.

While an example probabilistic system is provided above, it should be appreciated that modifications can be made to the described system and/or other scoring conventions can be used. For example, a positive contribution can instead represent a type of contextual information that suggests that the spoken user input was not intended for the virtual assistant and a negative contribution can instead represent a type of contextual information that suggests that the spoken user input was intended for the virtual assistant. In other examples, the contributions from the different types of contextual information can all be positive, with larger positive values indicating that the contextual information suggests that the spoken user input was intended (alternatively, not intended) for the virtual assistant. In yet other examples, the contributions from the different types of contextual information can all be negative, with larger negative values indicating that the contextual information suggests that the spoken user input was intended (alternatively, not intended) for the virtual assistant.

In other examples, a rule-based system can be used to determine whether or not the virtual assistant should respond to the spoken user input by evaluating any number of conditional rules that are based on the contextual information to determine whether or not the spoken user input was intended for the virtual assistant. In some examples, the rule-based systems can include the use of a decision tree. In other examples, the rules used by the rule-based system can be learned based on user behavior. To illustrate an example rule-based system, a first rule can include the condition that if the user is facing the device and the volume of the user's voice is above a threshold volume, then it can be determined that the user intended for the spoken user input to be directed at the virtual assistant. A second rule can include the condition that if, according to the user's calendar, the user is in a meeting, then it can be determined that the user did not intend for the spoken user input to be directed at the virtual assistant. Other similar rules containing any number of conditions that depend on any type of contextual information can be used to cause the device to determine that the spoken user input was or was not intended for the virtual assistant. In some examples, the rules can be ranked, such that if multiple rules evaluate to being true, the outcome of the higher ranking rule can be used as the result of the determination operation performed at block 308. Additionally, in some examples, if none of the rules evaluate to being true, a default determination that the spoken user input was intended for the virtual assistant (or a the spoken user input was not intended for the virtual assistant) can be made.

At block 310, if it was determined at block 308 that the virtual assistant should not respond to the spoken user input because the spoken user input was not intended for the virtual assistant, the process can return to block 304 to monitor the audio input for a spoken user input. In some examples, process 300 can proceed from block 310 to block 304 without generating a response the spoken user input. For example, process 300 can proceed from block 310 to block 304 without performing one or more of performing speech-to-text conversion, inferring user intent, identifying a task flow with steps and parameters designed to accomplish the inferred user intent, inputting specific requirements from the inferred user intent into the task flow, executing the task flow by invoking programs, methods, services, APIs, or the like, and generating output responses to the user in an audible (e.g., speech) and/or visual form. If it was instead determined at block 308 that the virtual assistant should respond to the spoken user input because the spoken user input was intended for the virtual assistant, the process can proceed to block 312.

At block 312, a response to the spoken user input can be generated by the user device and/or a remote server. In some examples, generating a response to the spoken user input can include one or more of performing speech-to-text conversion, inferring user intent, identifying a task flow with steps and parameters designed to accomplish the inferred user intent, inputting specific requirements from the inferred user intent into the task flow, executing the task flow by invoking programs, methods, services, APIs, or the like, and generating output responses to the user in an audible (e.g., speech) and/or visual form. For example, block 312 can include performing an operation requested by the user (e.g., opening an application, sending a message, calling a contact, performing a search query, creating a calendar appointment, or the like), providing information requested by the user (e.g., returning the result of a search query), performing an action that causes a change in the physical environment (e.g., communicating with a home appliance to lock a door), or the like. The operations can be performed locally on the user device, by transmitting data to a remote server for processing, or a combination thereof. After processing the spoken user input to provide an appropriate response at block 312, the process can return to block 304.

Using process 300, a virtual assistant implemented by a user device can selectively ignore or respond to spoken user inputs in a way that allows a user to speak to the virtual assistant in natural language without having to manually enter a start-point identifier, such as by pressing a physical or virtual button before speaking to the virtual assistant or by uttering a specific trigger phrase (e.g., a predetermined word or sequence of words, such as "Hey Siri") before speaking to the virtual assistant in natural language. In some examples, process 300 can be used to process all spoken user inputs received by user device 102.

To illustrate the operation of FIG. 3, one example interaction between a user and the virtual assistant can begin by the user verbally asking a question, such as "what time is it in New York?", without the user having to manually enter a start-point identifier, such as by pressing a physical or virtual button before speaking to the virtual assistant or by uttering a specific trigger phrase (e.g., a predetermined word or sequence of words, such as "Hey Siri"). At block 302, the user device can receive an audio input that includes the user's question. At block 304, the audio input can be monitored to detect a spoken user input. Since the audio input included the user's question, it can be determined at block 306 that the spoken user input was identified. At block 308, it can be determined, based on contextual information associated with the identified spoken user input, whether the virtual assistant should respond to the user's question. In this example, it can be determined (using either the rule-based or probabilistic system) that the virtual assistant should respond to the user's question because the contextual information indicates that the user was looking at the user device while speaking the question and that the volume of the user's voice was above a threshold volume. Thus, the process can proceed to block 310 and 312, where a response to the user's question can be generated. For example, at block 312, the user's question can be processed to determine the user's intent, identify tasks to be performed, and execute functions to determine and display a time of "5:01 p.m." in response to the user's query. Process 300 can then return to block 304.

The user can then verbally ask another question, such as "what is the weather there?", without the user having to manually enter a start-point identifier, such as by pressing a physical or virtual button before speaking to the virtual assistant or by uttering a specific trigger phrase (e.g., a predetermined word or sequence of words, such as "Hey Siri"). The audio input being received by the user device and that includes the user's second question can be monitored at block 304. Since the audio input included the user's second question, it can be determined at block 306 that the spoken user input was identified. At block 308, it can be determined, based on contextual information associated with the identified spoken user input, whether the virtual assistant should respond to the user's question. In this example, it can be determined (using either the rule-based or probabilistic system) that the virtual assistant should respond to the user's question because the contextual information indicates that the user asked the second question within a threshold length of time from receiving an answer to the first question, suggesting that the second question was part of the same conversation. Thus, the process can proceed to block 310 and 312, where a response to the user's question can be generated. For example, at block 312, the user's question can be processed to determine the user's intent, identify tasks to be performed, and execute functions to determine and display a message saying that "the weather is sunny" in response to the user's query. Process 300 can then return to block 304 to monitor the audio input for additional spoken user inputs.

Figure 4:
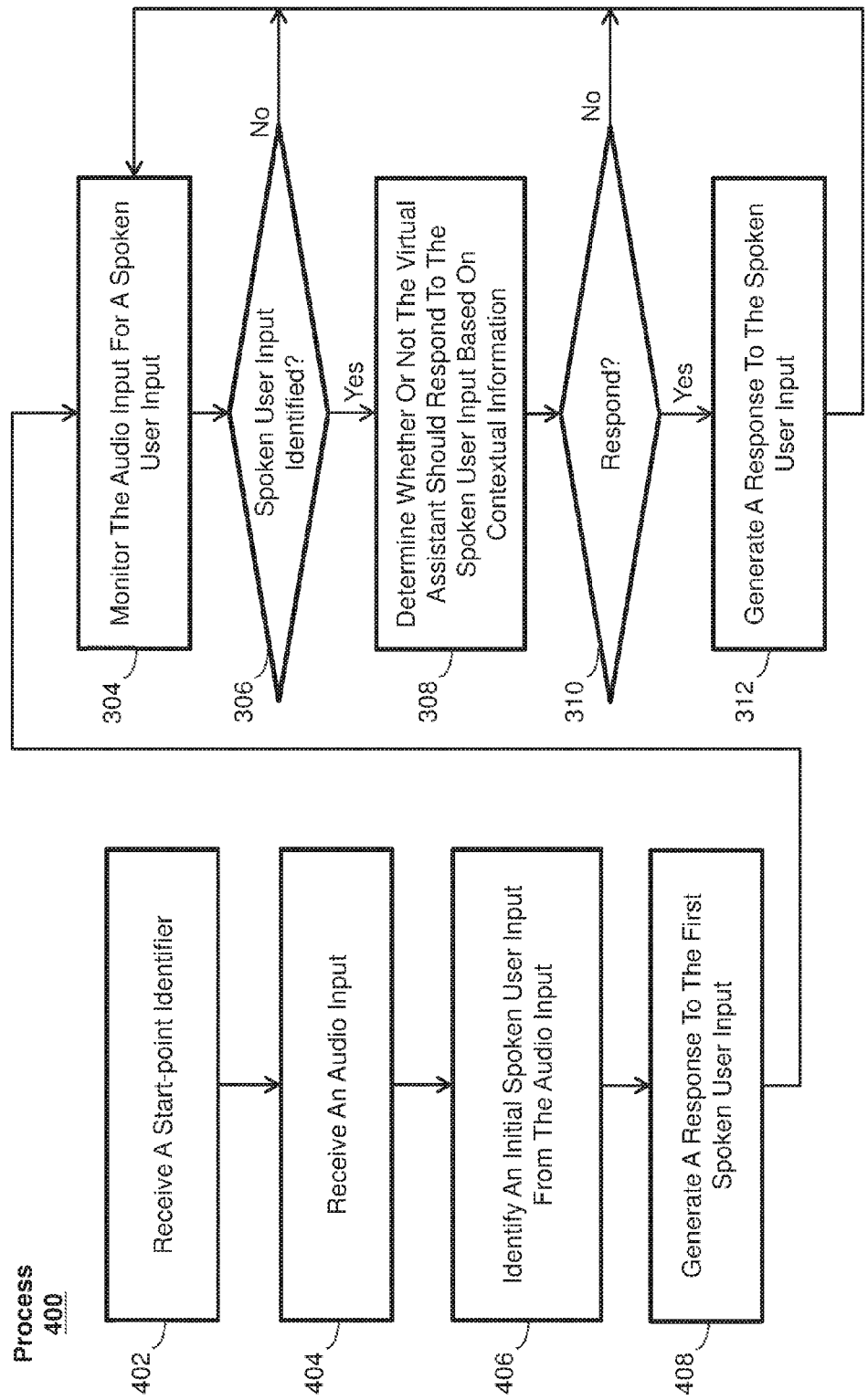
FIG. 4 illustrates another exemplary process for selectively processing and responding to a spoken user input using contextual information according to various examples.

In other examples, user device 102 can require that a start-point identifier be manually entered by the user prior to process 300 being invoked. For example, a user can be required to utter a trigger phrase or press a physical or virtual button before first speaking to the virtual assistant. In response to the manual start-point identifier, process 300 can be performed as described above and subsequent spoken user inputs can be processed without requiring user to enter additional start-point identifiers. FIG. 4 shows an example process for performing this modified interaction.

At block 402, a start-point identifier can be received. The start-point identifier can include a trigger phrase spoken by the user, a selection of a physical or virtual button, or other manual input received from the user. At block 404, an audio input can be received in a manner similar or identical to block 302, described above. At block 406, an initial spoken user input can be identified from the audio input received at block 404 by identifying an end-point for the first spoken user input. The end-point can be identified based on energy features of the audio input, as described above. At block 408, a response to the first spoken user input can be generated in a manner similar or identical to block 312, described above. However, in contrast to block 312, block 408 can be performed without determining whether or not the virtual assistant should respond to the first spoken user input in a manner similar to that of block 308, since a manual start-point identifier was received at block 402. After generating the response to the first spoken user input at block 408, the process can proceed to block 304. In some examples, block 302 can be omitted since the audio input was previously received at block 404. Blocks 304, 306, 308, 310, and 312 can be repeatedly performed, as described above with respect to FIG. 3.

In some examples, once block 304 is invoked in process 400, blocks 304, 306, 308, 310, and 312 can continue to be performed for all subsequent spoken user inputs. In other examples, performance of blocks 304, 306, 308, 310, and 312 can be stopped if no spoken user input is received (e.g., at blocks 304 and 306) for greater than a threshold length of time, resulting in the user having to enter a start-point identifier at block 402 before inputting the next spoken user input.

Using process 400, a virtual assistant implemented by a user device can only require a user to enter a manual start-point identifier once, and can allow the virtual assistant to selectively ignore or respond to subsequent spoken user inputs without requiring the user to repeatedly enter a manual start-point identifier before each subsequent spoken user input.

To illustrate the operation of FIG. 4, one example interaction between a user and the virtual assistant can begin by the user manually entering a start-point identifier, such as by pressing a physical or virtual button before speaking to the virtual assistant or by uttering a specific trigger phrase (e.g., a predetermined word or sequence of words, such as "Hey Siri"). The start-point identifier can be received at block 402. The user can then verbally ask a question, such as "what time is it in New York?" The user device can receive an audio input that includes the user's question at block 404. At block 406, the spoken user input can be identified from the audio input by identifying an end-point of the user's question. At block 408, a response to the user's question can be generated without performing a determination step similar to block 308, since the user manually identified the input as being directed at the virtual assistant at block 402. For example, at block 408, the user's question can be processed to determine the user's intent, identify tasks to be performed, and execute functions to determine and display a time of "5:01 p.m." in response to the user's query. Process 400 can then proceed to block 304.

The user can then verbally ask another question, such as "what is the weather like there?", without the user having to manually enter a start-point identifier, such as by pressing a physical or virtual button before speaking to the virtual assistant or by uttering a specific trigger phrase (e.g., a predetermined word or sequence of words, such as "Hey Siri"). The audio input being received by the user device and that includes the user's second question can be repeatedly monitored at blocks 304 and 306. Since the audio input included the user's second question, it can be determined at block 306 that the spoken user input was identified. At block 308, it can be determined, based on contextual information associated with the identified spoken user input, whether the virtual assistant should respond to the user's question. In this example, it can be determined (using either the rule-based or probabilistic system) that the virtual assistant should respond to the user's question because the contextual information indicates that the user asked the second question within a threshold length of time from receiving an answer to the first question, suggesting that the second question was part of the same conversation. Thus, the process can proceed to block 310 and 312, where a response to the user's question can be generated. For example, at block 312, the user's question can be processed to determine the user's intent, identify tasks to be performed, and execute functions to determine and display a message saying that "the weather is sunny" in response to the user's query. Process 300 can then return to block 304 to monitor the audio input for additional spoken user inputs.

In some examples, while process 300 or blocks 304, 306, 308, 310, and 312 of process 400 are being performed, a visual indicator can be displayed on a display of user device 102 to indicate that user device 102 is capable of accepting a spoken user input in natural language form without the use of trigger phrases or other manual inputs to indicate that a spoken user input is intended for user device 102.

Additionally, while the blocks of processes 300 and 400 are shown and described in a particular order, it should be appreciated that the blocks of processes 300 and 400 can be performed in other orders or at the same time. For example, in process 300, user device 102 can continually receive an audio input at block 302 while some or all of blocks 304, 306, 308, 310, and 312 can be performed. Similarly, in process 400, user device 102 can continually receive an audio input at block 404 while some or all of blocks 304, 306, 308, 310, 312, 406, and 408 can be performed.

It should be appreciated that the blocks of processes 300 and 400 can be performed on user device 102, server system 110, or a combination of user device 102 and server system 110. For instance, in some examples, all blocks of process 300 or 400 can be performed on user device 102. In other examples, all blocks of process 300 or 400 can be performed at server system 110. In yet other examples, some blocks of process 300 or 400 can be performed at user device 102, while other blocks of process 300 or 400 can be performed at server system 110.

Contextual Information

As discussed above, any number of types of contextual information, which can also include the features used by a classifier or machine learning system, can be used by processor(s) 204 and/or server system 110 at block 308 of process 300 or 400 to determine whether or not a spoken user input was intended for a virtual assistant. Described below are some example types of contextual information and ways that these types of contextual information can be used to determine whether or not a spoken user input was intended for a virtual assistant at block 308 of process 300.

In some examples, the contextual information can include time data from a clock or timer of user device 102. The time data can represent a length of time between any desired two or more events. For example, the time data can represent a length of time between the spoken user input being received and a time that a previous user input, such as a button press, mouse click, screen touch, previous spoken user input, or the like, was received. Generally, in some examples, a shorter length of time between the two events can be indicative that the user was more likely to have intended for the current spoken user input to be directed at the virtual assistant, while a longer length of time between events can be indicative that the user was less likely to have intended for the current spoken user input to be directed at the virtual assistant. However, in other examples, a longer length of time between the two events can be indicative that the user was more likely to have intended for the current spoken user input to be directed at the virtual assistant, while a shorter length of time between events can be indicative that the user was less likely to have intended for the current spoken user input to be directed at the virtual assistant.

In one example rule-based system, one rule that can be used (alone, in combination with other rules, or as one of multiple conditions in other rules) is that if the length of time between consecutive spoken user inputs is less than a threshold duration, then it can be determined that the user intended for the current spoken user input to be directed at the virtual assistant. Another rule that can be used (alone, in combination with other rules, or as one of multiple conditions in other rules) is that if the length of time between consecutive spoken user inputs is greater than or equal to the threshold duration, it can be determined that the user did not intend for the current spoken user input to be directed at the virtual assistant.

In one example probabilistic system, the length of time between consecutive spoken user inputs can be used to calculate a positive, negative, or neutral contribution to a final likelihood or confidence score, where the value of the contribution can have a linear or non-linear relationship with the value of the length of time. For example, a length of time less than a threshold duration can contribute a positive value to the final likelihood or confidence score, where the magnitude of the positive value can be greater for shorter lengths of time. Similarly, a length of time greater than or equal to the threshold duration can contribute a zero or negative value to the final likelihood or confidence score, where the magnitude of the negative value can be greater for longer lengths of time. In some examples, the length of time between consecutive spoken user inputs can be used to train a machine learning system of the probabilistic system.

In some examples, the contextual information can include conversation history data from memory 250 or another storage device located within or remote from user device 102. The conversation history data can include any number of previous spoken user inputs received from the user and/or responses generated and provided to the user by the user device. In some examples, the previously received spoken user inputs can be compared with the current spoken user input to determine if the current spoken user input is the same as a previously received spoken user input. In these examples, a match between the previous and current spoken user input (e.g., caused by the user repeating him or herself) can be indicative that the user was more likely to have intended for the current spoken user input to be directed at the virtual assistant, while no match between the previous and current spoken user input can be indicative that the user was less likely to have intended for the current spoken user input to be directed at the virtual assistant or can be neutral regarding the likelihood that the user intended for the current spoken user input to be directed at the virtual assistant. In some examples, the user repeating him or herself can be used in a feedback loop to train a machine learning system of the probabilistic system.

In one example rule-based system, one rule that can be used (alone, in combination with other rules, or as one of multiple conditions in other rules) is that if the current spoken user input is the same as or matches the previously received spoken user input, then it can be determined that the user intended for the current spoken user input to be directed at the virtual assistant. Another rule that can be used (alone, in combination with other rules, or as one of multiple conditions in other rules) is that if the current spoken user input is not the same as the previously received spoken user input, it can be determined that the user did not intend for the current spoken user input to be directed at the virtual assistant.

In one example probabilistic system, a determination that a previously received spoken user input is the same as or matches the current spoken user input can contribute a positive value to the final likelihood or confidence score, while no match between the previously received spoken user input and the current spoken user input can contribute a zero or a negative value to the final likelihood or confidence score. The magnitude of the positive or negative contribution can be adjusted based on the overall system design.

In other examples, a semantic similarity analysis can be performed on the current spoken user input and some or all of the conversation history data. In some examples, this can include computing a similarity of the determined user intents (e.g., the result of the natural language interpretation phase that takes the form of a tuple <command, parameters>). In other examples, performing the semantic similarity analysis to determine the semantic distance can include determining an edit distance combined with a similarity matrix. In these examples, a semantic distance between the current spoken user input and one or more of the previously received spoken user inputs or responses generated and provided to the user by the user device can be determined and used to determine the likelihood or confidence score that the spoken user input was intend for the virtual assistant at block 308. In these examples, a small semantic distance between the current spoken user input and one or more of the previously received spoken user inputs (e.g., the immediately preceding spoken user input) and/or one or more of the responses generated and provided to the user by the user device can be indicative that the user was more likely to have intended for the current spoken user input to be directed at the virtual assistant, while a large semantic distance between the current spoken user input and one or more of the previously received spoken user inputs (e.g., the immediately preceding spoken user input) and/or one or more of the responses generated and provided to the user by the user device can be indicative that the user was less likely to have intended for the current spoken user input to be directed at the virtual assistant.

In one example rule-based system, one rule that can be used (alone, in combination with other rules, or as one of multiple conditions in other rules) is that if a semantic distance between the current spoken user input and one or more previous spoken user inputs or responses generated by the user device is less than a threshold value, then it can be determined that the user intended for the current spoken user input to be directed at the virtual assistant. Another rule that can be used (alone, in combination with other rules, or as one of multiple conditions in other rules) is that if the semantic distance between the current spoken user input and one or more previous spoken user inputs or responses generated by the user device is greater than or equal to the threshold value, it can be determined that the user did not intend for the current spoken user input to be directed at the virtual assistant.

In one example probabilistic system, a semantic distance between the current spoken user input and one or more previous spoken user inputs or responses generated by the user device can be used to calculate a positive, negative, or neutral contribution to a final likelihood or confidence score, where the value of the contribution can have a linear or non-linear relationship with the semantic distance. For example, a semantic distance that is less than a threshold value can contribute a positive value to the final likelihood or confidence score, where the magnitude of the positive value can be greater for smaller semantic distances. Similarly, a semantic distance that is greater than or equal to the threshold value can contribute a zero or negative value to the final likelihood or confidence score, where the magnitude of the negative value can be greater for larger semantic distances.

In some examples, the contextual information can include distance data from a distance sensor, such as proximity sensor 214, of user device 102. The distance data can represent a spatial distance between the user device and the user (e.g., a distance between the user device and the user's face). Generally, in some examples, a shorter distance between the user device and the user can be indicative that the user was more likely to have intended for the current spoken user input to be directed at the virtual assistant, while a longer distance between the user device and the user can be indicative that the user was less likely to have intended for the current spoken user input to be directed at the virtual assistant. However, in other examples, a longer distance between the user device and the user can be indicative that the user was more likely to have intended for the current spoken user input to be directed at the virtual assistant, while a shorter distance between the user device and the user can be indicative that the user was less likely to have intended for the current spoken user input to be directed at the virtual assistant.

In one example rule-based system, one rule that can be used (alone, in combination with other rules, or as one of multiple conditions in other rules) is that if the distance between the user device and the user is less than a threshold distance, then it can be determined that the user intended for the current spoken user input to be directed at the virtual assistant. Another rule that can be used (alone, in combination with other rules, or as one of multiple conditions in other rules) is that if the distance between the user device and the user is greater than or equal to the threshold distance, it can be determined that the user did not intend for the current spoken user input to be directed at the virtual assistant.

In one example probabilistic system, the distance between the user device and the user can be used to calculate a positive, negative, or neutral contribution to a final likelihood or confidence score, where the value of the contribution can have a linear or non-linear relationship with the value of the distance between the user device and the user. For example, a distance less than a threshold distance can contribute a positive value to the final likelihood or confidence score, where the magnitude of the positive value can be greater for shorter distances. Similarly, a distance greater than or equal to the threshold distance can contribute a zero or negative value to the final likelihood or confidence score, where the magnitude of the negative value can be greater for greater distances.

In some examples, the contextual information can include audio data from audio subsystem 226. The audio data can include a representation of a volume of the spoken user input. Generally, in some examples, a higher volume of the spoken user input can be indicative that the user was more likely to have intended for the current spoken user input to be directed at the virtual assistant, while a lower volume of the spoken user input can be indicative that the user was less likely to have intended for the current spoken user input to be directed at the virtual assistant. However, in other examples, a lower volume of the spoken user input can be indicative that the user was more likely to have intended for the current spoken user input to be directed at the virtual assistant, while a higher volume of the spoken user input can be indicative that the user was less likely to have intended for the current spoken user input to be directed at the virtual assistant.

In one example rule-based system, one rule that can be used (alone, in combination with other rules, or as one of multiple conditions in other rules) is that if the volume of the spoken user input was greater than a threshold volume, then it can be determined that the user intended for the current spoken user input to be directed at the virtual assistant. Another rule that can be used (alone, in combination with other rules, or as one of multiple conditions in other rules) is that if the volume of the spoken user input was less than or equal to the threshold volume, it can be determined that the user did not intend for the current spoken user input to be directed at the virtual assistant.

In one example probabilistic system, the volume of the spoken user input can be used to calculate a positive, negative, or neutral contribution to a final likelihood or confidence score, where the value of the contribution can have a linear or non-linear relationship with the value of the volume of the spoken user input. For example, a volume greater than a threshold volume can contribute a positive value to the final likelihood or confidence score, where the magnitude of the positive value can be greater for higher volumes. Similarly, a volume less than or equal to the threshold volume can contribute a zero or negative value to the final likelihood or confidence score, where the magnitude of the negative value can be greater for lower volumes.

In some examples, the contextual information can include audio data from audio subsystem 226. The audio data can include a representation of a volume of the spoken user input. In some examples, if a previous spoken input was ignored and the volume of a current spoken user input is higher than the previous spoken user input, this can be indicative that the user was more likely to have intended for the current spoken user input to be directed at the virtual assistant.

In one example rule-based system, one rule that can be used (alone, in combination with other rules, or as one of multiple conditions in other rules) is that if the volume of the current spoken user input is greater than a volume of the previous spoken user input, then it can be determined that the user intended for the current spoken user input to be directed at the virtual assistant. Another rule that can be used (alone, in combination with other rules, or as one of multiple conditions in other rules) is that if the volume of the current spoken user input is less than or equal to the volume of the previous spoken user input, it can be determined that the user did not intend for the current spoken user input to be directed at the virtual assistant.

In one example probabilistic system, the volume of the spoken user input can be used to calculate a positive, negative, or neutral contribution to a final likelihood or confidence score, where the value of the contribution can have a linear or non-linear relationship with the value of the volume of the spoken user input. For example, if the volume of the current spoken user input is greater than a volume of an immediately previous spoken user input, a positive value to the final likelihood or confidence score can be added. Similarly, if the volume of the current spoken user input is less than a volume of an immediate previous spoken user input, a zero or negative value can be added to the final likelihood or confidence score.

In other examples, the audio data can be analyzed using known speaker recognition techniques to determine a number of distinct speakers that are near or within audio range of the user device. In these examples, a determination that more than one speaker is present can be indicative that the user was less likely to have intended for the current spoken user input to be directed at the virtual assistant (and was instead speaking to another person nearby), while a determination that only one speaker is present can be indicative that the user was more likely to have intended for the current spoken user input to be directed at the virtual assistant.

In one example rule-based system, one rule that can be used (alone, in combination with other rules, or as one of multiple conditions in other rules) is that if it is determined that more than one speaker was present when the spoken user input was received, then it can be determined that the user did not intend for the current spoken user input to be directed at the virtual assistant. Another rule that can be used (alone, in combination with other rules, or as one of multiple conditions in other rules) is that if it is determined that only one speaker was present when the spoken user input was received, it can be determined that the user intended for the current spoken user input to be directed at the virtual assistant.

In one example probabilistic system, a determination that more than one speaker was present when the spoken user input was received can contribute a negative value to the final likelihood or confidence score, while a determination that only one speaker was present when the spoken user input was received can contribute a zero or a positive value to the final likelihood or confidence score. The magnitude of the positive or negative contribution can be adjusted based on the overall system design.

In yet other examples, the audio data can be analyzed using known speaker recognition techniques to determine whether or not the spoken user input was received from a known or an authorized user of the user device (e.g., the owner of the device) or from the same speaker as a previously received spoken user input. In these examples, a determination that the spoken user input was received from the known or authorized user or from the same speaker as a previously received spoken user input can be indicative that the user was more likely to have intended for the current spoken user input to be directed at the virtual assistant, while a determination that the spoken user input was not received from the known or authorized user or from the same speaker as a previously received spoken user input can be indicative that the user was less likely to have intended for the current spoken user input to be directed at the virtual assistant.

In one example rule-based system, one rule that can be used (alone, in combination with other rules, or as one of multiple conditions in other rules) is that if it is determined that the spoken user input was received from the known or authorized user or from the same speaker as a previously received spoken user input, then it can be determined that the user intended for the current spoken user input to be directed at the virtual assistant. Another rule that can be used (alone, in combination with other rules, or as one of multiple conditions in other rules) is that if it is determined that the spoken user input was not received from the known or authorized user or from the same speaker as a previously received spoken user input, it can be determined that the user did not intend for the current spoken user input to be directed at the virtual assistant.

In one example probabilistic system, a determination that the spoken user input was received from the known or authorized user or from the same speaker as a previously received spoken user input can contribute a positive value to the final likelihood or confidence score, while a determination that the spoken user input was not received from the known or authorized user or from the same speaker as a previously received spoken user input can contribute a zero or a negative value to the final likelihood or confidence score. The magnitude of the positive or negative contribution can be adjusted based on the overall system design.

In some examples, the contextual information can include image data from camera subsystem 220 of user device 102. The image data can represent an image or video captured by camera subsystem 220. In some examples, the image data can be used to estimate a distance between the user device and the user. For example, the size of the user within the image can be used to estimate the distance between the user device and the user. The estimated distance between the user device and the user can be used in a rule-based or probabilistic system in a manner similar or identical to the distance data from proximity sensor 214, described above.

In other examples, the image data can be analyzed (e.g., using known eye-tracking techniques) to determine whether or not the user is looking at or facing the user device when the spoken user input was received. In these examples, a determination that the user was looking at the user device when the spoken user input was received can be indicative that the user is more likely to have intended for the current spoken user input to be directed at the virtual assistant, while a determination that the user was not looking at the user device when the spoken user input was received can be indicative that the user was less likely to have intended for the current spoken user input to be directed at the virtual assistant or can be neutral regarding the likelihood that the user intended for the current spoken user input to be directed at the virtual assistant.

In one example rule-based system, one rule that can be used (alone, in combination with other rules, or as one of multiple conditions in other rules) is that if it is determined that the user was looking at the user device when the spoken user input was received, then it can be determined that the user intended for the current spoken user input to be directed at the virtual assistant. Another rule that can be used (alone, in combination with other rules, or as one of multiple conditions in other rules) is that if it is determined that the user was not looking at the user device when the spoken user input was received, it can be determined that the user did not intend for the current spoken user input to be directed at the virtual assistant.

In one example probabilistic system, a determination that the user was looking at the user device when the spoken user input was received can contribute a positive value to the final likelihood or confidence score, while a determination that the user was not looking at the user device when the spoken user input was received can contribute a zero or a negative value to the final likelihood or confidence score. The magnitude of the positive or negative contribution can be adjusted based on the overall system design.

In yet other examples, the image data can be analyzed to determine an orientation of the device relative to the user. For example, the image data can be analyzed using known facial recognition techniques to determine whether or not the user is positioned in front of the user device based on whether or not the user appears in the field of view of optical sensor 222. Similarly, the image data can be analyzed using known image recognition techniques to determine whether or not the user is performing a particular action (e.g., pointing at the user device, gesturing at the user device, or the like) or positioned in a predefined way (e.g., sitting in front of a television, holding a remote, or the like). In these examples, a determination that the user was in front of the user device, performing a particular action, or positioned in a predefined way when the spoken user input was received can be indicative that the user was more likely to have intended for the current spoken user input to be directed at the virtual assistant, while a determination that the user was not in front of the user device, was not performing a particular action, or was not positioned in a predefined way when the spoken user input was received can be indicative that the user was less likely to have intended for the current spoken user input to be directed at the virtual assistant or can be neutral regarding the likelihood that the user intended for the current spoken user input to be directed at the virtual assistant.

In one example rule-based system, one rule that can be used (alone, in combination with other rules, or as one of multiple conditions in other rules) is that if it is determined that the user was in front of the user device, performing a particular action, or positioned in a predefined way when the spoken user input was received, then it can be determined that the user intended for the current spoken user input to be directed at the virtual assistant. Another rule that can be used (alone, in combination with other rules, or as one of multiple conditions in other rules) is that if it is determined that the user was not in front of the user device, was not performing a particular action, or was not positioned in a predefined way when the spoken user input was received, it can be determined that the user did not intend for the current spoken user input to be directed at the virtual assistant.

In one example probabilistic system, a determination that the user was in front of the user device, performing a particular action, or positioned in a predefined way when the spoken user input was received can contribute a positive value to the final likelihood or confidence score, while a determination that the user was not in front of the user device, was not performing a particular action, or was not positioned in a predefined way when the spoken user input was received can contribute a zero or a negative value to the final likelihood or confidence score. The magnitude of the positive or negative contribution can be adjusted based on the overall system design.

In some examples, the contextual information can include orientation data from motion sensor 210 of user device 102. Motion sensor 210 can include any type of orientation sensor, such as an inclinometer, compass, gyroscope, or the like, that is capable of generating orientation data that represents a free-space orientation of the user device. In some examples, certain orientations of the user device (e.g., the front of the device is facing up, the device is upright, the device is in an orientation in which a display of the device can be viewed by the user, or the like) can be indicative that the user was more likely to have intended for the current spoken user input to be directed at the virtual assistant, while other orientations of the user device (e.g., the front of the device is facing down, the device is upside down, the device is in an orientation in which a display of the device cannot be viewed by the user, or the like can be indicative that the user was less likely to have intended for the current spoken user input to be directed at the virtual assistant.

In one example rule-based system, one rule that can be used (alone, in combination with other rules, or as one of multiple conditions in other rules) is that if the device was in one of a set of orientations (e.g., the front of the device is facing up, the device is upright, the device is in an orientation in which a display of the device can be viewed by the user, or the like) when the spoken user input was received, then it can be determined that the user intended for the current spoken user input to be directed at the virtual assistant. Another rule that can be used (alone, in combination with other rules, or as one of multiple conditions in other rules) is that if the device was not in one of the set of orientations when the spoken user input was received, it can be determined that the user did not intend for the current spoken user input to be directed at the virtual assistant.

In one example probabilistic system, a determination that the user device is in one of a set of orientations (e.g., the front of the device is facing up, the device is upright, the device is in an orientation in which a display of the device can be viewed by the user, or the like) when the spoken user input was received can contribute a positive value to the final likelihood or confidence score, while a determination that user device was not in one of the set of orientations when the spoken user input was received can contribute a zero or a negative value to the final likelihood or confidence score. The magnitude of the positive or negative contribution can be adjusted based on the overall system design.

In some examples, the contextual information can include location data from a GPS receiver from other sensors 216 of user device 102. The location data can represent a geographical location of the user device. In some examples, receiving a spoken user input while the user device is in certain locations (e.g., at home, in an office, or the like) can be indicative that the user was more likely to have intended for the current spoken user input to be directed at the virtual assistant, while receiving the spoken user input while the user device is in certain other locations (e.g., at a movie theatre, in a conference room, or the like) can be indicative that the user was less likely to have intended for the current spoken user input to be directed at the virtual assistant.

In one example rule-based system, one rule that can be used (alone, in combination with other rules, or as one of multiple conditions in other rules) is that if the device was located in one of a set of locations (e.g., at home, in an office, or the like) when the spoken user input was received, then it can be determined that the user intended for the current spoken user input to be directed at the virtual assistant. Another rule that can be used (alone, in combination with other rules, or as one of multiple conditions in other rules)

is that if the device was not located in one of the set of locations when the spoken user input was received, it can be determined that the user did not intend for the current spoken user input to be directed at the virtual assistant.

In one example probabilistic system, a determination that the user device was located in one of a set of locations (e.g., at home, in an office, or the like) when the spoken user input was received can contribute a positive value to the final likelihood or confidence score, while a determination that the user device was not located in one of the set of locations when the spoken user input was received can contribute a zero or a negative value to the final likelihood or confidence score. The magnitude of the positive or negative contribution can be adjusted based on the overall system design.

In some examples, the contextual information can include operating state data from memory 250 or another storage device located within or remote from user device 102. The operating state data can include any information relating to the operating state of user device, such as whether or not content is being displayed or otherwise being presented to the user, a type or identification of the content being presented to the user, an application being run by the user device, whether or not a notification has been recently presented to the user, a previous or most recent contact, a previous or most recent email, a previous or most recent SMS message, a previous or most recent phone call, calendar entries, reminders entries, webpage visits, on/off state of a display of the user device, whether or not the user device is receiving user input other than the spoken user input, settings on the user device, previous activity, or the like. In some examples, receiving the spoken user input while the user device is in certain operating states (e.g., content or other information is being displayed to the user, content or other information is being audibly presented to the user, a particular type of content is being presented to the user, a particular content is being presented to the user, such as a conversation transcript between the user and a virtual assistant, an application is being run by the user device, a notification has been recently presented to the user, the display of the user device is on, the user device is receiving user input other than the spoken user input, such as a mouse input, keyboard input, touch sensitive display input, etc., an email was recently sent/received to/from a contact or a particular contact, an SMS message was recently sent/received to/from a contact or a particular contact, a phone call was recently sent/received to/from a contact or a particular contact, a particular setting is configured on the user device, a previous activity was performed, or the like) can be indicative that the user was more likely to have intended for the current spoken user input to be directed at the virtual assistant, while receiving the spoken user input while the user device is in certain other operating states (e.g., content or other information is not being displayed to the user, content or other information is not being audibly presented to the user, a particular type of content is not being presented to the user, a particular content is not being presented to the user, such as a conversation transcript between the user and a virtual assistant, an application is not being run by the user device, a notification has not been recently presented to the user, the display of the user device is off, the user device is not receiving user input other than the spoken user input, such as a mouse input, keyboard input, touch sensitive display input, etc., an email was not recently sent/received to/from a contact or a particular contact, an SMS message was not recently sent/received to/from a contact or a particular contact, a phone call was not recently sent/received to/from a contact or a particular contact, a particular setting is not configured on the user device, a previous activity was not performed, or the like) can be indicative that the user was less likely to have intended for the current spoken user input to be directed at the virtual assistant.

In one example rule-based system, one rule that can be used (alone, in combination with other rules, or as one of multiple conditions in other rules) is that if the display of the user device was on and the user device was presenting audio information to the user when the spoken user input was received, then it can be determined that the user intended for the current spoken user input to be directed at the virtual assistant. Another rule that can be used (alone, in combination with other rules, or as one of multiple conditions in other rules) is that if the display of the user device was off and the user device was not presenting audio information to the user when the spoken user input was received, it can be determined that the user did not intend for the current spoken user input to be directed at the virtual assistant. Other types of operating state data can similarly be used to generate rules that cause a determination to be made that the spoken user input was or was not intended for the virtual assistant.

In one example probabilistic system, a determination that the display of the user device was on and that the user device was presenting audio information to the user when the spoken user input was received can contribute a positive value to the final likelihood or confidence score, while a determination that the display of the user device was off and that the user device was not presenting audio information to the user when the spoken user input was received can contribute a zero or a negative value to the final likelihood or confidence score. The magnitude of the positive or negative contribution can be adjusted based on the overall system design. It should be appreciated that other types of operating state data can be used in a similar manner to make positive, negative, or neutral contributions to the final likelihood or confidence score depending on whether or not the operating state data indicates that the state of the device is one of a predetermined set of states.

In other examples, a semantic similarly analysis can be performed on the current spoken user input and some or all of the operating state data. In these examples, a semantic distance between the current spoken user input and one or more of the components of the operating state data can be determined and used to determine whether or not the spoken user input was intend for the user device at block 308. In these examples, small semantic distance between the current spoken user input and one or more components of the operating state data can be indicative that the user was more likely to have intended for the current spoken user input to be directed at the virtual assistant, while a large semantic distance between the current spoken user input and one or more components of the operating state data can be indicative that the user was less likely to have intended for the current spoken user input to be directed at the virtual assistant.

In one example rule-based system, one rule that can be used (alone, in combination with other rules, or as one of multiple conditions in other rules) is that if a semantic distance between the current spoken user input and one or more components of the operating state data (e.g., an application being run by the user device, a notification presented to the user, a name in a contact list, a previous contact, a previous email, a previous SMS message, content being presented to the user, a command expected to be received from the user, such as requests for directions while the user device is running a map application, content navigation instructions while the user device is in an eyes-free mode, a "start" instruction after previously receiving a "stop" or "pause" instruction, etc., or the like) is less than a threshold value, then it can be determined that the user intended for the current spoken user input to be directed at the virtual assistant. Another rule that can be used (alone, in combination with other rules, or as one of multiple conditions in other rules) is that if the semantic distance between the current spoken user input and one or more components of the operating state data is greater than or equal to a threshold value, it can be determined that the user did not intend for the current spoken user input to be directed at the virtual assistant.

In one example probabilistic system, a semantic distance between the current spoken user input and one or more components of the operating state data can be used to calculate a positive, negative, or neutral contribution to a final likelihood or confidence score, where the value of the contribution can have a linear or non-linear relationship with the semantic distance. For example, a semantic distance that is less than a threshold value can contribute a positive value to the final likelihood or confidence score, where the magnitude of the positive value can be greater for smaller semantic distances. Similarly, a semantic distance that is greater than or equal to the threshold value can contribute a zero or negative value to the final likelihood or confidence score, where the magnitude of the negative value can be greater for larger semantic distances.

In some examples, the contextual information can include lighting data from light sensor 212 of user device 102. The lighting data can include a representation of a brightness of ambient light received by light sensor 212. In some examples, a higher brightness of the sensed ambient light when the spoken user input was received can be indicative that the user was more likely to have intended for the current spoken user input to be directed at the virtual assistant (e.g., indicating that the user is in an environment in which speaking is acceptable), while a lower brightness of the sensed ambient light when the spoken user input was received can be indicative that the user was less likely to have intended for the current spoken user input to be directed at the virtual assistant (e.g., indicating that the user is in an environment in which speaking is not acceptable, such as a movie theatre). However, in other examples, a lower brightness of the sensed ambient light when the spoken user input was received can be indicative that the user was more likely to have intended for the current spoken user input to be directed at the virtual assistant, while a higher brightness of the sensed ambient light when the spoken user input was received can be indicative that the user was less likely to have intended for the current spoken user input to be directed at the virtual assistant.

In one example rule-based system, one rule that can be used (alone, in combination with other rules, or as one of multiple conditions in other rules) is that if the brightness of the sensed ambient light when the spoken user input was received is greater than a threshold brightness, then it can be determined that the user intended for the current spoken user input to be directed at the virtual assistant. Another rule that can be used (alone, in combination with other rules, or as one of multiple conditions in other rules) is that if the brightness of the sensed ambient light when the spoken user input was received input is less than or equal to the threshold brightness, it can be determined that the user did not intend for the current spoken user input to be directed at the virtual assistant.

In one example probabilistic system, the brightness of the sensed ambient light when the spoken user input was received can be used to calculate a positive, negative, or neutral contribution to a final likelihood or confidence score, where the value of the contribution can have a linear or non-linear relationship with the value of the brightness of the sensed ambient light. For example, a brightness less than a threshold brightness can contribute a negative value to the final likelihood or confidence score, where the magnitude of the negative value can be greater for lower brightness values. Similarly, a brightness greater than or equal to the threshold brightness can contribute a zero or positive value to the final likelihood or confidence score, where the magnitude of the negative value can be greater for higher brightness values.

In some examples, the contextual information can include speech recognition data from an automatic speech recognition (ASR) engine located within or remote from user device 102 (e.g., from server system 110). The speech recognition data can include an indication of whether or not the ASR engine was able to recognize the spoken user input and/or is capable of responding to the spoken user input. In some examples, an indication that the ASR engine was able to recognize the spoken user input and/or is capable of responding to the spoken user input can be indicative that the user was more likely to have intended for the current spoken user input to be directed at the virtual assistant, while an indication that the ASR engine was not able to recognize the spoken user input and/or is not capable of responding to the spoken user input can be indicative that the user was less likely to have intended for the current spoken user input to be directed at the virtual assistant.

In one example rule-based system, one rule that can be used (alone, in combination with other rules, or as one of multiple conditions in other rules) is that if the ASR engine was able to recognize the spoken user input and/or is capable of responding to the spoken user input, then it can be determined that the user intended for the current spoken user input to be directed at the virtual assistant. Another rule that can be used (alone, in combination with other rules, or as one of multiple conditions in other rules) is that if the ASR engine was not able to recognize the spoken user input and/or is not capable of responding to the spoken user input, it can be determined that the user did not intend for the current spoken user input to be directed at the virtual assistant.

In one example probabilistic system, a determination that the ASR engine was able to recognize the spoken user input and/or is capable of responding to the spoken user input can contribute a positive value to the final likelihood or confidence score, while a determination that the ASR engine was not able to recognize the spoken user input and/or is not capable of responding to the spoken user input can contribute a zero or a negative value to the final likelihood or confidence score. The magnitude of the positive or negative contribution can be adjusted based on the overall system design.

In other examples, the speech recognition data from the ASR engine can further include an indication of the length (e.g., number of words, duration of speech, or the like) of the spoken user input. Generally, in some examples, a shorter length of the spoken user input can be indicative that the user was more likely to have intended for the current spoken user input to be directed at the virtual assistant, while a longer length of the spoken user input can be indicative that the user was less likely to have intended for the current spoken user input to be directed at the virtual assistant. However, in some examples, a longer length of the spoken user input can be indicative that the user was more likely to have intended for the current spoken user input to be directed at the virtual assistant, while a shorter length of the spoken user input can be indicative that the user was less likely to have intended for the current spoken user input to be directed at the virtual assistant.

In one example rule-based system, one rule that can be used (alone, in combination with other rules, or as one of multiple conditions in other rules is that if the length of the spoken user input is less than a threshold length, then it can be determined that the user intended for the current spoken user input to be directed at the virtual assistant. Another rule that can be used (alone, in combination with other rules, or as one of multiple conditions in other rules) is that if the length of the spoken user input is greater than or equal to the threshold length, it can be determined that the user did not intend for the current spoken user input to be directed at the virtual assistant.

In one example probabilistic system, the length of the spoken user input can be used to calculate a positive, negative, or neutral contribution to a final likelihood or confidence score, where the value of the contribution can have a linear or non-linear relationship with the value of the length of the spoken user input. For example, a length less than a threshold length can contribute a positive value to the final likelihood or confidence score, where the magnitude of the positive value can be greater for shorter lengths. Similarly, a length greater than or equal to the threshold distance can contribute a zero or negative value to the final likelihood or confidence score, where the magnitude of the negative value can be greater for longer lengths.

In other examples, the speech recognition data from the ASR engine can further include noun or pronouns identified from within the spoken user input. For example, the speech recognition data can include noun or pronouns, such as "honey," "he," "she," or the first or last name of a person. Generally, in some examples, the presence of one of these nouns or pronouns can be indicative that the user was less likely to have intended for the current spoken user input to be directed at the virtual assistant, while the absence of one of these nouns or pronouns (or presence of non-human identifiers, such as "Siri") can be indicative that the user was more likely to have intended for the current spoken user input to be directed at the virtual assistant.

In one example rule-based system, one rule that can be used (alone, in combination with other rules, or as one of multiple conditions in other rules) is that if the spoken user input includes one of a set of nouns or pronouns, then it can be determined that the user did not intend for the current spoken user input to be directed at the virtual assistant. Another rule that can be used (alone, in combination with other rules, or as one of multiple conditions in other rules) is that if the spoken user input does not include one of the set of nouns or pronouns (or includes one of another set of nouns or pronouns), it can be determined that the user intended for the current spoken user input to be directed at the virtual assistant.

In one example probabilistic system, a determination that the spoken user input includes one of a set of nouns or pronouns can contribute a negative value to the final likelihood or confidence score, while a determination that the spoken user input does not include one of the set of nouns or pronouns (or includes one of another set of nouns or pronouns) can contribute a positive or zero value to the final likelihood or confidence score. The magnitude of the positive or negative contribution can be adjusted based on the overall system design.

In some examples, the contextual information can include user data from memory 250 or another storage device located within or remote from user device 102. The user data can include any type of information associated with the user, such as a contact list, calendar, preferences, personal information, financial information, family information, or the like. In some examples, the user data can be compared with other types of contextual information at block 308 to assist in the determination of whether or not the spoken user input was intend for the virtual assistant. For example, the time that the spoken user input was received can be compared with the user's calendar to determine if the user was at an event in which the user was more or less likely to be conversing with the virtual assistant of the user device, the speech recognition data from the ASR engine can be compared with contacts in the user's contact list to determine if the a name from the user's contact list was mentioned in the spoken user input, the speech recognition data from the ASR engine can be compared with user preferences to determine if the spoken user input corresponds to a previously defined phrase that should or should not be ignored by the virtual assistant, or the like.

In one example rule-based system, one rule that can be used (alone, in combination with other rules, or as one of multiple conditions in other rules) is that if the current spoken user input was received at a time within a predetermined set of times (e.g., when the user's calendar indicates that the user was in a meeting or otherwise engaged in an activity deemed to be one in which the user would not converse with a virtual assistant), then it can be determined that the user did not intend for the current spoken user input to be directed at the virtual assistant. Another rule that can be used (alone, in combination with other rules, or as one of multiple conditions in other rules) is that if the current spoken user input was received at a time outside the predetermined set of times (e.g., when the user's calendar indicates that the user was not in a meeting or otherwise engaged in an activity deemed to be one in which the user would not converse with a virtual assistant), it can be determined that the user intended for the current spoken user input to be directed at the virtual assistant. Other types of user data can similarly be used to generate rules that cause a determination to be made that the spoken user input was or was not intended for the virtual assistant.

In one example probabilistic system, a determination that the current spoken user input was received at a time that the user's calendar indicates that the user was in a meeting or otherwise engaged in an activity deemed to be one in which the user would not converse with a virtual assistant can contribute a negative or zero value to the final likelihood or confidence score, while a determination that the current spoken user input was received at a time that the user's calendar indicates that the user was not in a meeting or otherwise engaged in an activity deemed to be one in which the user would not converse with a virtual assistant can contribute a positive value to the final likelihood or confidence score. The magnitude of the positive or negative contribution can be adjusted based on the overall system design. It should be appreciated that other types of user data can be used in a similar manner to make positive, negative, or neutral contributions to the final likelihood or confidence score.

In some examples, the contextual information can include motion data from motion sensor 210 or an accelerometer of other sensors 216 of user device 102. The motion data can represent movement of the user device and can be used to detect movement of the device caused by the user shaking the device, movement of the device toward or away from the user (e.g., movement toward or away from the user's mouth), movement caused by the user wearing the device (e.g., as a watch or other wearable device), or the like. In some examples, certain motions experienced by the user device (e.g., shaking, movement associated with the user device being worn by the user, movement toward the user, etc.) can be indicative that the user was more likely to have intended for the current spoken user input to be directed at the virtual assistant, while other motions experienced by the user device (e.g., movement away from the user) can be indicative that the user was less likely to have intended for the current spoken user input to be directed at the virtual assistant.

In one example rule-based system, one rule that can be used (alone, in combination with other rules, or as one of multiple conditions in other rules) is that if the motion data indicates that the user device was moved toward the user's mouth before the spoken user input was received, then it can be determined that the user intended for the current spoken user input to be directed at the virtual assistant. Another rule that can be used (alone, in combination with other rules, or as one of multiple conditions in other rules) is that if the motion data indicates that the device was not moved toward the user's mouth before the spoken user input was received, it can be determined that the user did not intend for the current spoken user input to be directed at the virtual assistant. Other movements can similarly be used to generate rules that cause a determination to be made that the spoken user input was or was not intended for the virtual assistant.

In one example probabilistic system, a determination that the user device was moved in one of a predetermined set of movements (e.g., toward the user's mouth before the spoken user input was received) can contribute a positive value to the final likelihood or confidence score, while a determination that user device was not moved in one of a predetermined set of movements can contribute a zero or a negative value to the final likelihood or confidence score. The magnitude of the positive or negative contribution can be adjusted based on the overall system design. It should be appreciated that other movements can be used in a similar manner to make positive, negative, or neutral contributions to the final likelihood or confidence score.

In some examples, the contextual information can include temperature data from a temperature sensor of other sensors 216 of user device 102. The temperature data can represent a temperature sensed by the temperature sensor and can be used to determine whether or not the user device is being held by the user. For example, a higher temperature or a temperature in a particular range can suggest that the device is being held in the hand of a user, while a lower temperature or a temperature outside the particular range can suggest that the device is not being held by the user.

In one example rule-based system, one rule that can be used (alone, in combination with other rules, or as one of multiple conditions in other rules) is that if the temperature is within a particular range of temperatures corresponding to the user device being held by a user, then it can be determined that the user intended for the current spoken user input to be directed at the virtual assistant. Another rule that can be used (alone, in combination with other rules, or as one of multiple conditions in other rules) is that if the temperature is not within a particular range of temperatures corresponding to the user device being held by a user, it can be determined that the user did not intend for the current spoken user input to be directed at the virtual assistant.

In one example probabilistic system, a determination, based on the temperature data, that the user device was being held by the user when the spoken user input was received can contribute a positive value to the final likelihood or confidence score, while a determination, based on the temperature data, that the user device was not being held by the user when the spoken user input was received can contribute a zero or a negative value to the final likelihood or confidence score. The magnitude of the positive or negative contribution can be adjusted based on the overall system design.

Electronic Device

Figure 5:
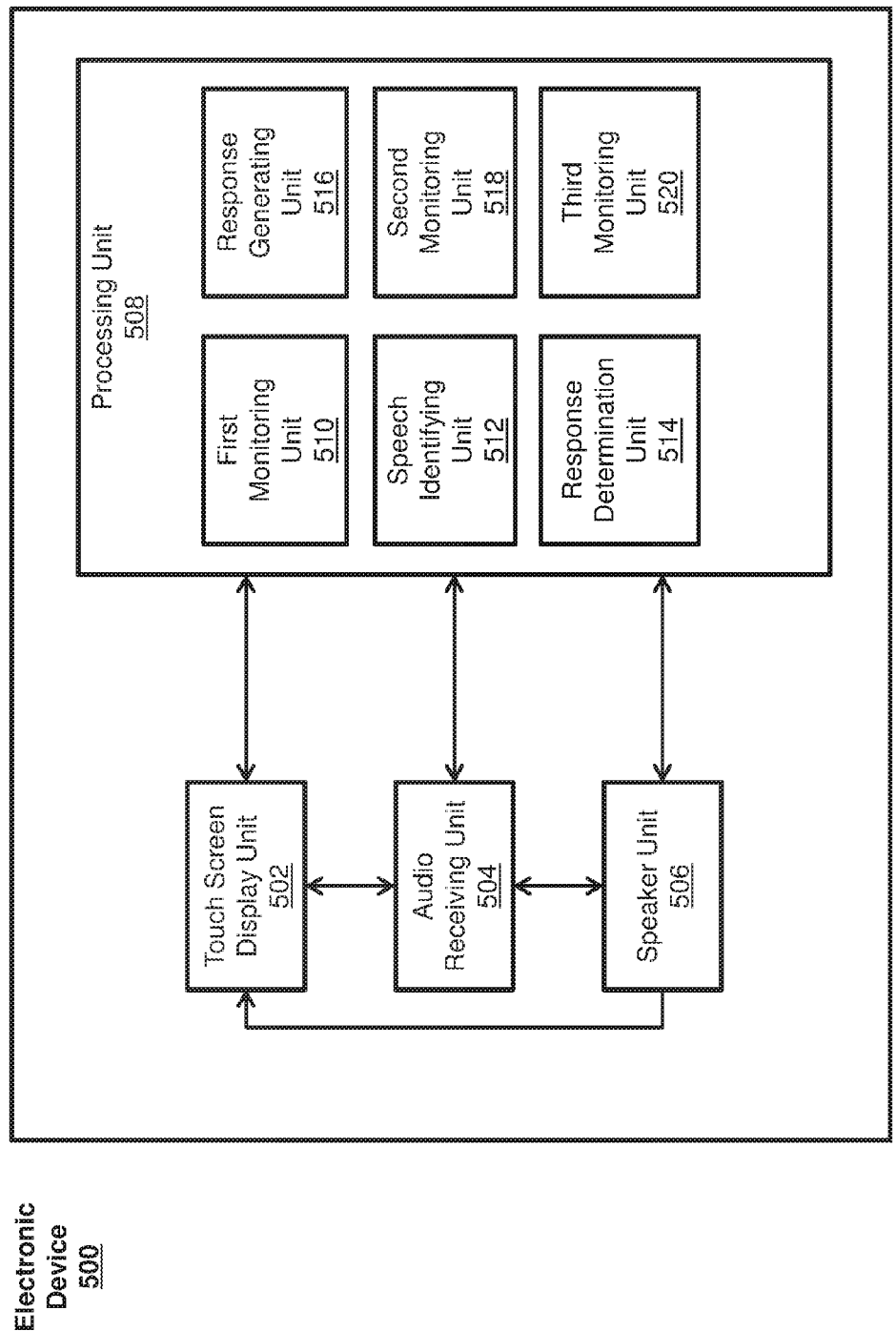
FIG. 5 illustrates a functional block diagram of an electronic device configured to selectively process and respond to a spoken user input using contextual information according to various examples.

In accordance with some examples, FIG. 5 shows a functional block diagram of an electronic device 500 configured in accordance with the principles of the various described examples. The functional blocks of the device can be implemented by hardware, software, or a combination of hardware and software to carry out the principles of the various described examples. It is understood by persons of skill in the art that the functional blocks described in FIG. 5 can be combined or separated into sub-blocks to implement the principles of the various described examples. Therefore, the description herein optionally supports any possible combination or separation or further definition of the functional blocks described herein.

As shown in FIG. 5, electronic device 500 can include a touch screen display unit 502 configured to display a user interface and to receive touch input, and a sound receiving unit 504 configured to receive sound input. In some examples, electronic device 500 can include a speaker unit 506 configured to generate sound. Electronic device 500 can further include a processing unit 508 coupled to touch screen display unit 502 and sound receiving unit 504 (and, optionally, coupled to speaker unit 506). In some examples, processing unit 508 can include a first monitoring unit 510, a speech identifying unit 512, a response determination unit 514, a response generating unit 516, a second monitoring unit 518, and a third monitoring unit 520.

Processing unit 508 can be configured to receive an audio input (e.g., from audio receiving unit 504). Processing unit 508 can be configured to monitor the audio input (e.g., using first monitoring unit 510) to identify a first spoken user input in the audio input. Upon identifying the first spoken user input in the audio input, processing unit 508 can be configured to determine (e.g., using response determination unit 514), based on contextual information associated with the first spoken user input, whether a response to the first spoken user input should be generated. In response to determining that a response should be generated, processing unit 508 can be configured to generate a response (e.g., using response generating unit 516) to the first spoken user input and to again monitor the received audio input for a second spoken user request (e.g., using second monitoring unit 518). In response to determining that a response should not be generated, processing unit 508 can be configured to again monitor the received audio input for a second spoken user request (e.g., using second monitoring unit 518) without generating a response to the first spoken user input.

In some examples, processing unit 508 can be configured to determine (e.g., using response determination unit 514) whether to respond to the first spoken user input without identifying one or more predetermined words at the start of the first spoken user input. In other examples, processing unit 508 can be configured to determine (e.g., using response determination unit 514) whether to respond to the first spoken user input without identifying a physical or virtual button input received prior to receiving the first spoken user input.

In some examples, processing unit 508 can be configured to generate a response (e.g., using response generating unit 516) to the first spoken user input by performing speech-to-text conversion on the first spoken user input, determining a user intent based on the first spoken user input, determining a task to be performed based on the first spoken user input, determining a parameter for the task to be performed based on the first spoken user input, performing the task to be performed, displaying a text response to the first spoken user input, or outputting an audio response to the first spoken user input.

In some examples, processing unit 508 can be configured to determine (e.g., using response determination unit 514) whether to respond to the first spoken user input by evaluating one or more conditional rules that depend on the contextual information associated with the first spoken user input.

In some examples, processing unit 508 can be configured to determine (e.g., using response determination unit 514) whether to respond to the first spoken user input by calculating a likelihood score that the virtual assistant should respond to the first spoken user input based on the contextual information associated with the first spoken user input and comparing the likelihood score to a threshold value.

In some examples, processing unit 508 can be configured to determine (e.g., using response determination unit 514) whether to respond to the first spoken user input based on contextual information associated with the first spoken user input that includes one or more of an elapsed time between receiving the first spoken user input and a previous user input, a previous spoken user input, a distance between a user and the electronic device when the first spoken user input was received, an orientation of the electronic device when the first spoken user input was received, an orientation between the user and the electronic device when the first spoken user input was received, a direction of the user's eyes when the first spoken user input was received, an indication of whether the first spoken user input was recognized by an automatic speech recognizer, a semantic relationship between the first spoken user input and the previous spoken user input, a length of the first spoken user input, an identification of a speaker of the first spoken user input, a time the first spoken user input was received, an indication of whether the electronic device was outputting information to the user when the first spoken user input was received, an expectation of receiving input from the user, an indication of whether the electronic device was being held when the first spoken user input was received, an operating state of the electronic device when the first spoken user input was received, a previous action performed by the electronic device, an indication of whether content was being displayed by the electronic device when the first spoken user input was received, a semantic relationship between the first spoken user input and the content being displayed by the electronic device when the first spoken user input was received, a position of the user when the first spoken user input was received, a gesture being performed by the user when the first spoken user input was received, a previous output of the electronic device, a location of the electronic device when the first spoken user input was received, an application being run by the electronic device when the first spoken user input was received, a previous contact, a previous email, a previous SMS message, a movement of the electronic device when the first spoken user input was received, a user setting of the electronic device, an amount of light sensed by the electronic device when the first spoken user input was received, and calendar data.

In some examples, processing unit 508 can be configured to determine (e.g., using response determination unit 514) whether to respond to the first spoken user input by calculating a likelihood score that the virtual assistant should respond to the first spoken user input based on contextual information that includes an elapsed time between receiving the first spoken user input and a previous user input. In these examples, calculating the likelihood score can include decreasing the likelihood score in response to a value of the elapsed time being greater than a threshold duration and increasing the likelihood score in response to the value of the elapsed time being less than the threshold duration. In some examples, the previous user input can include a previously received touch input on a touch sensitive display, a mouse click, a button press, or a spoken user input.

In some examples, processing unit 508 can be configured to determine (e.g., using response determination unit 514) whether to respond to the first spoken user input by calculating a likelihood score that the virtual assistant should respond to the first spoken user input based on contextual information that includes a previous spoken user input. In these examples, calculating the likelihood score can include increasing the likelihood score in response to detecting a match between the previous spoken user input and the first spoken user input.

In some examples, processing unit 508 can be configured to determine (e.g., using response determination unit 514) whether to respond to the first spoken user input by calculating a likelihood score that the virtual assistant should respond to the first spoken user input based on contextual information that includes a distance between a user and the electronic device when the first spoken user input was received. In these examples, calculating the likelihood score can include decreasing the likelihood score in response to the distance being greater than a threshold distance and increasing the likelihood score in response to the distance being less than the threshold distance. In some examples, the distance can be determined based at least in part on a volume of the first spoken user input, a distance measured by a proximity sensor, an image generated by an image sensor, or accelerometer data from an accelerometer.

In some examples, processing unit 508 can be configured to determine (e.g., using response determination unit 514) whether to respond to the first spoken user input by calculating a likelihood score that the virtual assistant should respond to the first spoken user input based on contextual information that includes an orientation of the electronic device when the first spoken user input was received. In these examples, calculating the likelihood score can include decreasing the likelihood score in response to the orientation of the device being facedown or upside down and increasing the likelihood score in response to the orientation of the device being face up or upright.

In some examples, processing unit 508 can be configured to determine (e.g., using response determination unit 514) whether to respond to the first spoken user input by calculating a likelihood score that the virtual assistant should respond to the first spoken user input based on contextual information that includes an orientation between the user and the electronic device when the first spoken user input was received. In these examples, calculating the likelihood score can include increasing the likelihood score in response to the orientation being one in which a display of the electronic device is oriented towards the user and decreasing the likelihood score in response to the orientation being one in which the display of the electronic device is oriented away from the user.

In some examples, processing unit 508 can be configured to determine (e.g., using response determination unit 514) whether to respond to the first spoken user input by calculating a likelihood score that the virtual assistant should respond to the first spoken user input based on contextual information that includes a direction of the user's eyes when the first spoken user input was received. In these examples, calculating the likelihood score can include increasing the likelihood score in response to the direction of the user's eyes being pointed at the electronic device and decreasing the likelihood score in response to the direction of the user's eyes being pointed away from the electronic device.

In some examples, processing unit 508 can be configured to determine (e.g., using response determination unit 514) whether to respond to the first spoken user input by calculating a likelihood score that the virtual assistant should respond to the first spoken user input based on contextual information that includes an indication of whether the first spoken user input was recognized by an automatic speech recognizer. In these examples, calculating the likelihood score can include increasing the likelihood score in response to the indication indicating that the first spoken user input was recognized by the automatic speech recognizer and decreasing the likelihood score in response to the indication indicating that the first spoken user input was not recognized by the automatic speech recognizer.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and the previous spoken user input. In these examples, calculating the likelihood score can include increasing the likelihood score in response to a value of the semantic relationship being greater than a spoken user input semantic threshold value and decreasing the likelihood score in response to the value of the semantic relationship being less than the spoken user input semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a length of the first spoken user input. In these examples, calculating the likelihood score can include increasing the likelihood score in response to the length of the first spoken user input less than a threshold length and decreasing the likelihood score in response to the length of the first spoken user input being greater than the threshold length.

In some examples, processing unit 508 can be configured to determine (e.g., using response determination unit 514) whether to respond to the first spoken user input by calculating a likelihood score that the virtual assistant should respond to the first spoken user input based on contextual information that includes an identification of a speaker of the first spoken user input. In some examples, calculating the likelihood score can include increasing the likelihood score in response to the identification of the speaker of the first spoken user input being one of a list of known or authorized speakers and decreasing the likelihood score in response to the identification of the speaker of the first spoken user input not being one of a list of known or authorized speakers. In other examples, calculating the likelihood score can include increasing the likelihood score in response to the identification of the speaker of the first spoken user input being the same as an identification of a speaker of the previous spoken user input and decreasing the likelihood score in response to the identification of the speaker of the first spoken user input being different than the identification of the speaker of the previous spoken user input.

In some examples, processing unit 508 can be configured to determine (e.g., using response determination unit 514) whether to respond to the first spoken user input by calculating a likelihood score that the virtual assistant should respond to the first spoken user input based on contextual information that includes a time the first spoken user input was received. In these examples, calculating the likelihood score can include increasing the likelihood score in response to the time being within a predetermined set of times and decreasing the likelihood score in response to the time not being within the predetermined set of times.

In some examples, processing unit 508 can be configured to determine (e.g., using response determination unit 514) whether to respond to the first spoken user input by calculating a likelihood score that the virtual assistant should respond to the first spoken user input based on contextual information that includes an indication of whether the electronic device was outputting information to the user when the first spoken user input was received. In these examples, calculating the likelihood score can include increasing the likelihood score in response to the indication indicating that the electronic device was outputting information to the user when the first spoken user input was received and decreasing the likelihood score in response to the indication indicating that the electronic device was not outputting information to the user when the first spoken user input was received.

In some examples, processing unit 508 can be configured to determine (e.g., using response determination unit 514) whether to respond to the first spoken user input by calculating a likelihood score that the virtual assistant should respond to the first spoken user input based on contextual information that includes an expectation of receiving input from the user. In these examples, calculating the likelihood score can include increasing the likelihood score in response to the expectation of receiving input from the user indicating that input was expected to be received from the user and decreasing the likelihood score in response to the expectation of receiving input from the user indicating that input was not expected to be received from the user.

In some examples, processing unit 508 can be configured to determine (e.g., using response determination unit 514) whether to respond to the first spoken user input by calculating a likelihood score that the virtual assistant should respond to the first spoken user input based on contextual information that includes an indication of whether the electronic device is being held when the first spoken user input was received. In these examples, calculating the likelihood score can include increasing the likelihood score in response to the indication indicating that the electronic device was being held when the first spoken user input was received and decreasing the likelihood score in response to the indication indicating that the electronic device was not being held when the first spoken user input was received.

In some examples, processing unit 508 can be configured to determine (e.g., using response determination unit 514) whether to respond to the first spoken user input by calculating a likelihood score that the virtual assistant should respond to the first spoken user input based on contextual information that includes an operating state of the electronic device when the first spoken user input was received. In these examples, calculating the likelihood score can include increasing the likelihood score in response to the operating state of the electronic device being one of a set of predetermined operating states and decreasing the likelihood score in response to the operating state of the electronic device not being one of the set of predetermined operating states.

In some examples, processing unit 508 can be configured to determine (e.g., using response determination unit 514) whether to respond to the first spoken user input by calculating a likelihood score that the virtual assistant should respond to the first spoken user input based on contextual information that includes a previous action performed by the electronic device. In these examples, calculating the likelihood score can include increasing the likelihood score in response to the previous action performed by the electronic device being one of a set of predetermined actions and decreasing the likelihood score in response to the previous action performed by the electronic device not being one of the set of predetermined actions.

In some examples, processing unit 508 can be configured to determine (e.g., using response determination unit 514) whether to respond to the first spoken user input by calculating a likelihood score that the virtual assistant should respond to the first spoken user input based on contextual information that includes an indication of whether the content was being displayed by the electronic device when the first spoken user input was received. In these examples, calculating the likelihood score can include increasing the likelihood score in response to the indication indicating that content was being displayed by the electronic device when the first spoken user input was received.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and content being displayed by the electronic device when the first spoken user input was received. In these examples, calculating the likelihood score can include increasing the likelihood score in response to a value of the semantic relationship being greater than a content semantic threshold value and decreasing the likelihood score in response to the value of the semantic relationship being less than the content semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a position of the user when the first spoken user input was received. In these examples, calculating the likelihood score can include increasing the likelihood score in response to the position of the user being one of a predetermined set of positions and decreasing the likelihood score in response to the position of the user not being one of the predetermined set of positions.

In some examples, processing unit 508 can be configured to determine (e.g., using response determination unit 514) whether to respond to the first spoken user input by calculating a likelihood score that the virtual assistant should respond to the first spoken user input based on contextual information that includes a gesture being performed by the user when the first spoken user input was received. In these examples, calculating the likelihood score can include increasing the likelihood score in response to the gesture being one of a predetermined set of gestures and decreasing the likelihood score in response to the gesture not being one of the predetermined set of gestures.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and the previous output of the electronic device. In these examples, calculating the likelihood score can include increasing the likelihood score in response to a value of the semantic relationship being greater than a previous output semantic threshold value and decreasing the likelihood score in response to the value of the semantic relationship being less than the previous output semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a location of the electronic device when the first spoken user input was received. In these examples, calculating the likelihood score can include decreasing the likelihood score in response to the location being one of a predetermined set of locations and increasing the likelihood score in response to the location not being one of the predetermined set of locations.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input an application being run by the electronic device when the first spoken user input was received. In these examples, calculating the likelihood score can include increasing the likelihood score in response to a value of the semantic relationship being greater than an application semantic threshold value and decreasing the likelihood score in response to the value of the semantic relationship being less than the application semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and a previous contact. In these examples, calculating the likelihood score can include increasing the likelihood score in response to a value of the semantic relationship being greater than a previous contact semantic threshold value and decreasing the likelihood score in response to the value of the semantic relationship being less than the previous contact semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and a previous email. In these examples, calculating the likelihood score can include increasing the likelihood score in response to a value of the semantic relationship being greater than a previous email semantic threshold value and decreasing the likelihood score in response to the value of the semantic relationship being less than the previous email semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a semantic relationship between the first spoken user input and a previous SMS message. In these examples, calculating the likelihood score can include increasing the likelihood score in response to a value of the semantic relationship being greater than a previous SMS message semantic threshold value and decreasing the likelihood score in response to the value of the semantic relationship being less than the previous SMS semantic threshold value.

In some examples, processing unit 508 can be configured to determine (e.g., using response determination unit 514) whether to respond to the first spoken user input by calculating a likelihood score that the virtual assistant should respond to the first spoken user input based on contextual information that includes a movement of the electronic device. In these examples, calculating the likelihood score can include increasing the likelihood score in response to the movement being one of a predetermined set of movements and decreasing the likelihood score in response to the movement not being one of the predetermined set of movements.

In some examples, processing unit 508 can be configured to determine (e.g., using response determination unit 514) whether to respond to the first spoken user input by calculating a likelihood score that the virtual assistant should respond to the first spoken user input based on contextual information that includes a user setting. In these examples, calculating the likelihood score can include increasing the likelihood score in response to the user setting being one of a predetermined set of user settings and decreasing the likelihood score in response to the user setting not being one of the predetermined set of user settings.

In some examples, processing unit 508 can be configured to determine (e.g., using response determination unit 514) whether to respond to the first spoken user input by calculating a likelihood score that the virtual assistant should respond to the first spoken user input based on contextual information that includes an amount of light sensed by the electronic device. In these examples, calculating the likelihood score can include increasing the likelihood score in response to the amount of light being greater than a threshold amount of light and decreasing the likelihood score in response to the amount of light being less than the threshold amount of light.

In some examples, processing unit 508 can be configured to determine (e.g., using response determination unit 514) whether to respond to the first spoken user input by calculating a likelihood score that the virtual assistant should respond to the first spoken user input based on contextual information that includes calendar data. In these examples, calculating the likelihood score can include decreasing the likelihood score in response to the calendar data indicating that the user is occupied at the time that the first spoken user input was received.

Processing unit 508 can be further configured to monitor the audio input (e.g., using second monitoring unit 518) to identify a second spoken user input in the audio input. Upon identifying the second spoken user input in the audio input, processing unit 508 can be configured to determine (e.g., using response determination unit 514), based on contextual information associated with the second spoken user input, whether a response to the second spoken user input should be generated. In response to determining that a response should be generated, processing unit 508 can be configured to generate a response (e.g., using response generating unit 516) to the second spoken user input and to again monitor the received audio input for a third spoken user request (e.g., using third monitoring unit 520). In response to determining that a response should not be generated, processing unit 508 can be configured to again monitor the received audio input for the third spoken user request (e.g., using third monitoring unit 520) without generating a response to the second spoken user input.

As described above, one aspect of the present technology is the gathering and use of data available from various sources to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A method for operating a virtual assistant on an electronic device, the method comprising:
    receiving, at the electronic device, an audio input;
    monitoring the audio input to identify a first spoken user input, wherein the first spoken user input comprises a user request;
    identifying the first spoken user input in the audio input;
    determining whether to respond to the first spoken user input based on contextual information associated with the first spoken user input, wherein the contextual information comprises a direction of the user's gaze when the first spoken user input was received, wherein the determining comprises:
        calculating a likelihood score that the virtual assistant should provide an audible response to the first spoken user input based on the contextual information associated with the first spoken user input, wherein the audible response at least partially satisfies the user request;
        increasing the likelihood score in response to the direction of the user's gaze being pointed at the electronic device when the first spoken user input was received; and
        decreasing the likelihood score in response to the direction of the user's gaze being pointed away from the electronic device when the first spoken user input was received;
    in response to a determination to respond to the first spoken user input:
        generating the audible response to the first spoken user input; and
        monitoring the audio input to identify a second spoken user input; and
    in response to a determination not to respond to the first spoken user input, monitoring the audio input to identify the second spoken user input without generating the audible response to the first spoken user input.

2. The method of claim 1, wherein determining whether to respond to the first spoken user input based on contextual information associated with the first spoken user input excludes identifying one or more predetermined words at a start of the first spoken user input.

3. The method of claim 1, wherein determining whether to respond to the first spoken user input based on contextual information associated with the first spoken user input excludes identifying a physical or virtual button input received prior to receiving the first spoken user input.

4. The method of claim 1, wherein generating the audible response to the first spoken user input comprises one or more of:
    performing speech-to-text conversion on the first spoken user input;
    determining a user intent based on the first spoken user input;
    determining a task to be performed based on the first spoken user input;
    determining a parameter for the task to be performed based on the first spoken user input;
    performing the task to be performed;
    displaying a text response to the first spoken user input; and
    outputting an audio response to the first spoken user input.

5. The method of claim 1, wherein determining whether to respond to the first spoken user input based on contextual information associated with the first spoken user input comprises:
    evaluating one or more conditional rules that depend on the contextual information associated with the first spoken user input.

6. The method of claim 1, wherein determining whether to respond to the first spoken user input based on contextual information associated with the first spoken user input comprises:
    comparing the likelihood score to a threshold value.

7. The method of claim 6, wherein the contextual information comprises an elapsed time between receiving the first spoken user input and a previous user input, and wherein calculating the likelihood score that the virtual assistant should provide the audible response to the first spoken user input based on contextual information comprises:
    decreasing the likelihood score in response to a value of the elapsed time being greater than a threshold duration; and
    increasing the likelihood score in response to the value of the elapsed time being less than the threshold duration.

8. The method of claim 6, wherein the contextual information comprises a previous spoken user input, and wherein calculating the likelihood score that the virtual assistant should provide the audible response to the first spoken user input based on contextual information comprises increasing the likelihood score in response to detecting a match between the previous spoken user input and the first spoken user input.

9. The method of claim 6, wherein the contextual information comprises a distance between a user and the electronic device when the first spoken user input was received, and wherein calculating the likelihood score that the virtual assistant should provide the audible response to the first spoken user input based on contextual information comprises:
    decreasing the likelihood score in response to the distance being greater than a threshold distance; and
    increasing the likelihood score in response to the distance being less than the threshold distance.

10. The method of claim 6, wherein the contextual information comprises an orientation of the electronic device when the first spoken user input was received, and wherein calculating the likelihood score that the virtual assistant should provide the audible response to the first spoken user input based on contextual information comprises:

decreasing the likelihood score in response to the orientation of the device being face down or upside down; and increasing the likelihood score in response to the orientation of the device being face up or upright.

11. The method of claim 6, wherein the contextual information comprises an orientation between the user and the electronic device when the first spoken user input was received, and wherein calculating the likelihood score that the virtual assistant should provide the audible response to the first spoken user input based on contextual information comprises:

increasing the likelihood score in response to the orientation being one in which a display of the electronic device is oriented towards the user; and decreasing the likelihood score in response to the orientation being one in which the display of the electronic device is oriented away from the user.

12. The method of claim 6, wherein the contextual information comprises an indication of whether the first spoken user input was recognized by an automatic speech recognizer, and wherein calculating the likelihood score that the virtual assistant should provide the audible response to the first spoken user input based on contextual information comprises:

increasing the likelihood score in response to the indication indicating that the first spoken user input was recognized by the automatic speech recognizer; and decreasing the likelihood score in response to the indication indicating that the first spoken user input was not recognized by the automatic speech recognizer.

13. The method of claim 6, wherein the contextual information comprises a semantic relationship between the first spoken user input and the previous spoken user input, and wherein determining the likelihood score that the virtual assistant should provide the audible response to the first spoken user input based on contextual information comprises:

increasing the likelihood score in response to a value of the semantic relationship being greater than a spoken user input semantic threshold value; and decreasing the likelihood score in response to the value of the semantic relationship being less than the spoken user input semantic threshold value.

14. The method of claim 6, wherein the contextual information comprises a length of the first spoken user input, and wherein calculating the likelihood score that the virtual assistant should provide the audible response to the first spoken user input based on contextual information comprises:

increasing the likelihood score in response to the length of the first spoken user input less than a threshold length; and decreasing the likelihood score in response to the length of the first spoken user input being greater than the threshold length.

15. The method of claim 6, wherein the contextual information comprises an identification of a speaker of the first spoken user input.

16. The method of claim 6, wherein the contextual information comprises a time the first spoken user input was received, and wherein calculating the likelihood score that the virtual assistant should provide the audible response to the first spoken user input based on contextual information comprises:

increasing the likelihood score in response to the time being within a predetermined set of times; and decreasing the likelihood score in response to the time not being within the predetermined set of times.

17. The method of claim 6, wherein the contextual information comprises an indication of whether the electronic device was outputting information to the user when the first spoken user input was received, and wherein calculating the likelihood score that the virtual assistant should provide the audible response to the first spoken user input based on contextual information comprises:

increasing the likelihood score in response to the indication indicating that the electronic device was outputting information to the user when the first spoken user input was received; and decreasing the likelihood score in response to the indication indicating that the electronic device was not outputting information to the user when the first spoken user input was received.

18. The method of claim 6, wherein the contextual information comprises an expectation of receiving input from the user, and wherein calculating the likelihood score that the virtual assistant should provide the audible response to the first spoken user input based on contextual information comprises:

increasing the likelihood score in response to the expectation of receiving input from the user indicating that input was expected to be received from the user; and decreasing the likelihood score in response to the expectation of receiving input from the user indicating that input was not expected to be received from the user.

19. The method of claim 6, wherein the contextual information comprises an indication of whether the electronic device is being held when the first spoken user input was received, and wherein calculating the likelihood score that the virtual assistant should provide the audible response to the first spoken user input based on contextual information comprises:

increasing the likelihood score in response to the indication indicating that the electronic device was being held when the first spoken user input was received; and decreasing the likelihood score in response to the indication indicating that the electronic device was not being held when the first spoken user input was received.

20. The method of claim 6, wherein the contextual information comprises an operating state of the electronic device when the first spoken user input was received, and wherein calculating the likelihood score that the virtual assistant should provide the audible response to the first spoken user input based on contextual information comprises:

increasing the likelihood score in response to the operating state of the electronic device being one of a set of predetermined operating states; and decreasing the likelihood score in response to the operating state of the electronic device not being one of the set of predetermined operating states.

21. The method of claim 6, wherein the contextual information comprises a previous action performed by the electronic device, and wherein calculating the likelihood score that the virtual assistant should provide the audible response to the first spoken user input based on contextual information comprises:

increasing the likelihood score in response to the previous action performed by the electronic device being one of a set of predetermined actions; and decreasing the likelihood score in response to the previous action performed by the electronic device not being one of the set of predetermined actions.

22. The method of claim 6, wherein the contextual information comprises an indication of whether content was being displayed by the electronic device when the first spoken user input was received, and wherein calculating the likelihood score that the virtual assistant should provide the audible response to the first spoken user input based on contextual information comprises increasing the likelihood score in response to the indication indicating that content was being displayed by the electronic device when the first spoken user input was received.

23. The method of claim 6, wherein the contextual information comprises a semantic relationship between the first spoken user input and content being displayed by the electronic device when the first spoken user input was received, and wherein calculating the likelihood score that the virtual assistant should provide the audible response to the first spoken user input based on contextual information comprises:
    increasing the likelihood score in response to a value of the semantic relationship being greater than a content semantic threshold value; and
    decreasing the likelihood score in response to the value of the semantic relationship being less than the content semantic threshold value.

24. The method of claim 6, wherein the contextual information comprises a position of the user when the first spoken user input was received, and wherein calculating the likelihood score that the virtual assistant should provide the audible response to the first spoken user input based on contextual information comprises:
    increasing the likelihood score in response to the position of the user being one of a predetermined set of positions; and
    decreasing the likelihood score in response to the position of the user not being one of the predetermined set of positions.

25. The method of claim 6, wherein the contextual information comprises a gesture being performed by the user when the first spoken user input was received, and wherein calculating the likelihood score that the virtual assistant should provide the audible response to the first spoken user input based on contextual information comprises:
    increasing the likelihood score in response to the gesture being one of a predetermined set of gestures; and
    decreasing the likelihood score in response to the gesture not being one of the predetermined set of gestures.

26. The method of claim 6, wherein the contextual information comprises a semantic relationship between the first spoken user input and the previous output of the electronic device, and wherein calculating the likelihood score that the virtual assistant should provide the audible response to the first spoken user input based on contextual information comprises:
    increasing the likelihood score in response to a value of the semantic relationship being greater than a previous output semantic threshold value; and
    decreasing the likelihood score in response to the value of the semantic relationship being less than the previous output semantic threshold value.

27. The method of claim 6, wherein the contextual information comprises a location of the electronic device when the first spoken user input was received, and wherein calculating the likelihood score that the virtual assistant should provide the audible response to the first spoken user input based on contextual information comprises:
    decreasing the likelihood score in response to the location being one of a predetermined set of locations; and
    increasing the likelihood score in response to the location not being one of the predetermined set of locations.

28. The method of claim 6, wherein the contextual information comprises a semantic relationship between the first spoken user input an application being run by the electronic device when the first spoken user input was received, and wherein calculating the likelihood score that the virtual assistant should provide the audible response to the first spoken user input device based on contextual information comprises:
    increasing the likelihood score in response to a value of the semantic relationship being greater than an application semantic threshold value; and
    decreasing the likelihood score in response to the value of the semantic relationship being less than the application semantic threshold value.

29. The method of claim 6, wherein the contextual information comprises a semantic relationship between the first spoken user input and a previous contact, and wherein calculating the likelihood score that the virtual assistant should provide the audible response to the first spoken user input based on contextual information comprises:
    increasing the likelihood score in response to a value of the semantic relationship being greater than a previous contact semantic threshold value; and
    decreasing the likelihood score in response to the value of the semantic relationship being less than the previous contact semantic threshold value.

30. The method of claim 6, wherein the contextual information comprises a semantic relationship between the first spoken user input and a previous email, and wherein calculating the likelihood score that the virtual assistant should provide the audible response to the first spoken user input based on contextual information comprises:
    increasing the likelihood score in response to a value of the semantic relationship being greater than a previous email semantic threshold value; and
    decreasing the likelihood score in response to the value of the semantic relationship being less than the previous email semantic threshold value.

31. The method of claim 6, wherein the contextual information comprises a semantic relationship between the first spoken user input and a previous SMS message, and wherein calculating the likelihood score that the virtual assistant should provide the audible response to the first spoken user input based on contextual information comprises:
    increasing the likelihood score in response to a value of the semantic relationship being greater than a previous SMS message semantic threshold value; and
    decreasing the likelihood score in response to the value of the semantic relationship being less than the previous SMS semantic threshold value.

32. The method of claim 6, wherein the contextual information comprises a movement of the electronic device, and wherein calculating the likelihood score that the virtual assistant should provide the audible response to the first spoken user input based on contextual information comprises:
    increasing the likelihood score in response to the movement being one of a predetermined set of movements; and decreasing the likelihood score in response to the movement not being one of the predetermined set of movements.

33. The method of claim 6, wherein the contextual information comprises a user setting, and wherein calculating the likelihood score that the virtual assistant should provide the audible response to the first spoken user input based on contextual information comprises:
increasing the likelihood score in response to the user setting being one of a predetermined set of user settings; and
decreasing the likelihood score in response to the user setting not being one of the predetermined set of user settings.

34. The method of claim 6, wherein the contextual information comprises an amount of light sensed by the electronic device, and wherein calculating the likelihood score that the virtual assistant should provide the audible response to the first spoken user input based on contextual information comprises:
increasing the likelihood score in response to the amount of light being greater than a threshold amount of light; and
decreasing the likelihood score in response to the amount of light being less than the threshold amount of light.

35. The method of claim 6, wherein the contextual information comprises calendar data, and wherein calculating the likelihood score that the virtual assistant should provide the audible response to the first spoken user input based on contextual information comprises decreasing the likelihood score in response to the calendar data indicating that the user is occupied at the time that the first spoken user input was received.

36. A non-transitory computer-readable storage medium storing one or more programs, the one or more programs comprising instructions, which when executed by one or more processors of an electronic device, cause the device to:
receive an audio input;
monitor the audio input to identify a first spoken user input, wherein the first spoken user input comprises a user request;
identify the first spoken user input in the audio input;
determine whether to respond to the first spoken user input based on contextual information associated with the first spoken user input, wherein the contextual information comprises a direction of the user's gaze when the first spoken user input was received, wherein the determining comprises:
calculating a likelihood score that the virtual assistant should provide an audible response to the first spoken user input based on the contextual information associated with the first spoken user input, wherein the audible response at least partially satisfies the user request;
increasing the likelihood score in response to the direction of the user's gaze being pointed at the electronic device when the first spoken user input was received; and
decreasing the likelihood score in response to the direction of the user's gaze being pointed away from the electronic device when the first spoken user input was received;
responsive to a determination to respond to the first spoken user input:
generate the audible response to the first spoken user input; and
monitor the audio input to identify a second spoken user input; and
responsive to a determination not to respond to the first spoken user input, monitor the audio input to identify the second spoken user input without generating the audible response to the first spoken user input.

37. A system comprising:
one or more processors;
memory; and
one or more programs, wherein the one or more programs are stored in the memory and configured to be executed by the one or more processors, the one or more programs including instructions for:
receiving an audio input;
monitoring the audio input to identify a first spoken user input, wherein the first spoken user input comprises a user request;
identifying the first spoken user input in the audio input;
determining whether to respond to the first spoken user input based on contextual information associated with the first spoken user input, wherein the contextual information comprises a direction of the user's gaze when the first spoken user input was received, wherein the determining comprises:
calculating a likelihood score that the virtual assistant should provide an audible response to the first spoken user input based on the contextual information associated with the first spoken user input, wherein the audible response at least partially satisfies the user request;
increasing the likelihood score in response to the direction of the user's gaze being pointed at the electronic device when the first spoken user input was received; and
decreasing the likelihood score in response to the direction of the user's gaze being pointed away from the electronic device when the first spoken user input was received;
responsive to a determination to respond to the first spoken user input:
generating the audible response to the first spoken user input; and
monitoring the audio input to identify a second spoken user input; and
responsive to a determination not to respond to the first spoken user input, monitoring the audio input to identify the second spoken user input without generating the audible response to the first spoken user input.

38. The non-transitory computer readable storage medium of claim 36, wherein determining whether to respond to the first spoken user input based on contextual information associated with the first spoken user input excludes identifying a physical or virtual button input received prior to receiving the first spoken user input.

39. The non-transitory computer readable storage medium of claim 36, wherein determining whether to respond to the first spoken user input based on contextual information associated with the first spoken user input comprises:
evaluating one or more conditional rules that depend on the contextual information associated with the first spoken user input.

40. The non-transitory computer readable storage medium of claim 36, wherein the contextual information comprises an elapsed time between receiving the first spoken user input and a previous user input, and wherein calculating the likelihood score that the virtual assistant should provide the audible response to the first spoken user input based on contextual information comprises:
- decreasing the likelihood score in response to a value of the elapsed time being greater than a threshold duration; and
- increasing the likelihood score in response to the value of the elapsed time being less than the threshold duration.

41. The non-transitory computer readable storage medium of claim 36, wherein the contextual information comprises a previous spoken user input, and wherein calculating the likelihood score that the virtual assistant should provide the audible response to the first spoken user input based on contextual information comprises increasing the likelihood score in response to detecting a match between the previous spoken user input and the first spoken user input.

42. The non-transitory computer readable storage medium of claim 36, wherein the contextual information comprises an orientation of the electronic device when the first spoken user input was received, and wherein calculating the likelihood score that the virtual assistant should provide the audible response to the first spoken user input based on contextual information comprises:
- decreasing the likelihood score in response to the orientation of the device being face down or upside down; and
- increasing the likelihood score in response to the orientation of the device being face up or upright.

43. The non-transitory computer readable storage medium of claim 36, wherein the contextual information comprises an orientation between the user and the electronic device when the first spoken user input was received, and wherein calculating the likelihood score that the virtual assistant should provide the audible response to the first spoken user input based on contextual information comprises:
- increasing the likelihood score in response to the orientation being one in which a display of the electronic device is oriented towards the user; and
- decreasing the likelihood score in response to the orientation being one in which the display of the electronic device is oriented away from the user.

44. The non-transitory computer readable storage medium of claim 36, wherein the contextual information comprises an indication of whether the first spoken user input was recognized by an automatic speech recognizer, and wherein calculating the likelihood score that the virtual assistant should provide the audible response to the first spoken user input based on contextual information comprises:
- increasing the likelihood score in response to the indication indicating that the first spoken user input was recognized by the automatic speech recognizer; and
- decreasing the likelihood score in response to the indication indicating that the first spoken user input was not recognized by the automatic speech recognizer.

45. The non-transitory computer readable storage medium of claim 36, wherein the contextual information comprises a semantic relationship between the first spoken user input and the previous spoken user input, and wherein determining the likelihood score that the virtual assistant should provide the audible response to the first spoken user input based on contextual information comprises:
- increasing the likelihood score in response to a value of the semantic relationship being greater than a spoken user input semantic threshold value; and
- decreasing the likelihood score in response to the value of the semantic relationship being less than the spoken user input semantic threshold value.

46. The non-transitory computer readable storage medium of claim 36, wherein the contextual information comprises an identification of a speaker of the first spoken user input.

47. The non-transitory computer readable storage medium of claim 36, wherein the contextual information comprises an indication of whether the electronic device was outputting information to the user when the first spoken user input was received, and wherein calculating the likelihood score that the virtual assistant should provide the audible response to the first spoken user input based on contextual information comprises:
- increasing the likelihood score in response to the indication indicating that the electronic device was outputting information to the user when the first spoken user input was received; and
- decreasing the likelihood score in response to the indication indicating that the electronic device was not outputting information to the user when the first spoken user input was received.

48. The non-transitory computer readable storage medium of claim 36, wherein the contextual information comprises an indication of whether the electronic device is being held when the first spoken user input was received, and wherein calculating the likelihood score that the virtual assistant should provide the audible response to the first spoken user input based on contextual information comprises:
- increasing the likelihood score in response to the indication indicating that the electronic device was being held when the first spoken user input was received; and
- decreasing the likelihood score in response to the indication indicating that the electronic device was not being held when the first spoken user input was received.

49. The non-transitory computer readable storage medium of claim 36, wherein the contextual information comprises a previous action performed by the electronic device, and wherein calculating the likelihood score that the virtual assistant should provide the audible response to the first spoken user input based on contextual information comprises:
- increasing the likelihood score in response to the previous action performed by the electronic device being one of a set of predetermined actions; and
- decreasing the likelihood score in response to the previous action performed by the electronic device not being one of the set of predetermined actions.

50. The non-transitory computer readable storage medium of claim 36, wherein the contextual information comprises an indication of whether content was being displayed by the electronic device when the first spoken user input was received, and wherein calculating the likelihood score that the virtual assistant should provide the audible response to the first spoken user input based on contextual information comprises increasing the likelihood score in response to the indication indicating that content was being displayed by the electronic device when the first spoken user input was received.

51. The non-transitory computer readable storage medium of claim 36, wherein the contextual information comprises a semantic relationship between the first spoken user input and content being displayed by the electronic device when the first spoken user input was received, and wherein calculating the likelihood score that the virtual assistant should provide the audible response to the first spoken user input based on contextual information comprises:
- increasing the likelihood score in response to a value of the semantic relationship being greater than a content semantic threshold value; and decreasing the likelihood score in response to the value of the semantic relationship being less than the content semantic threshold value.

52. The non-transitory computer readable storage medium of claim 36, wherein the contextual information comprises a position of the user when the first spoken user input was received, and wherein calculating the likelihood score that the virtual assistant should provide the audible response to the first spoken user input based on contextual information comprises:
increasing the likelihood score in response to the position of the user being one of a predetermined set of positions; and
decreasing the likelihood score in response to the position of the user not being one of the predetermined set of positions.

53. The non-transitory computer readable storage medium of claim 36, wherein the contextual information comprises a semantic relationship between the first spoken user input and the previous output of the electronic device, and wherein calculating the likelihood score that the virtual assistant should provide the audible response to the first spoken user input based on contextual information comprises:
increasing the likelihood score in response to a value of the semantic relationship being greater than a previous output semantic threshold value; and
decreasing the likelihood score in response to the value of the semantic relationship being less than the previous output semantic threshold value.

54. The non-transitory computer readable storage medium of claim 36, wherein the contextual information comprises a semantic relationship between the first spoken user input an application being run by the electronic device when the first spoken user input was received, and wherein calculating the likelihood score that the virtual assistant should provide the audible response to the first spoken user input device based on contextual information comprises:
increasing the likelihood score in response to a value of the semantic relationship being greater than an application semantic threshold value; and
decreasing the likelihood score in response to the value of the semantic relationship being less than the application semantic threshold value.

55. The non-transitory computer readable storage medium of claim 36, wherein the contextual information comprises a movement of the electronic device, and wherein calculating the likelihood score that the virtual assistant should provide the audible response to the first spoken user input based on contextual information comprises:
increasing the likelihood score in response to the movement being one of a predetermined set of movements; and
decreasing the likelihood score in response to the movement not being one of the predetermined set of movements.

56. The system of claim 37, wherein determining whether to respond to the first spoken user input based on contextual information associated with the first spoken user input excludes identifying a physical or virtual button input received prior to receiving the first spoken user input.

57. The system of claim 37, wherein determining whether to respond to the first spoken user input based on contextual information associated with the first spoken user input comprises:
evaluating one or more conditional rules that depend on the contextual information associated with the first spoken user input.

58. The system of claim 37, wherein the contextual information comprises an elapsed time between receiving the first spoken user input and a previous user input, and wherein calculating the likelihood score that the virtual assistant should provide the audible response to the first spoken user input based on contextual information comprises:
decreasing the likelihood score in response to a value of the elapsed time being greater than a threshold duration; and
increasing the likelihood score in response to the value of the elapsed time being less than the threshold duration.

59. The system of claim 37, wherein the contextual information comprises a previous spoken user input, and wherein calculating the likelihood score that the virtual assistant should provide the audible response to the first spoken user input based on contextual information comprises increasing the likelihood score in response to detecting a match between the previous spoken user input and the first spoken user input.

60. The system of claim 37, wherein the contextual information comprises an orientation of the electronic device when the first spoken user input was received, and wherein calculating the likelihood score that the virtual assistant should provide the audible response to the first spoken user input based on contextual information comprises:
decreasing the likelihood score in response to the orientation of the device being face down or upside down; and
increasing the likelihood score in response to the orientation of the device being face up or upright.

61. The system of claim 37, wherein the contextual information comprises an orientation between the user and the electronic device when the first spoken user input was received, and wherein calculating the likelihood score that the virtual assistant should provide the audible response to the first spoken user input based on contextual information comprises:
increasing the likelihood score in response to the orientation being one in which a display of the electronic device is oriented towards the user; and
decreasing the likelihood score in response to the orientation being one in which the display of the electronic device is oriented away from the user.

62. The system of claim 37, wherein the contextual information comprises an indication of whether the first spoken user input was recognized by an automatic speech recognizer, and wherein calculating the likelihood score that the virtual assistant should provide the audible response to the first spoken user input based on contextual information comprises:
increasing the likelihood score in response to the indication indicating that the first spoken user input was recognized by the automatic speech recognizer; and
decreasing the likelihood score in response to the indication indicating that the first spoken user input was not recognized by the automatic speech recognizer.

63. The system of claim 37, wherein the contextual information comprises a semantic relationship between the first spoken user input and the previous spoken user input, and wherein determining the likelihood score that the virtual assistant should provide the audible response to the first spoken user input based on contextual information comprises:

increasing the likelihood score in response to a value of the semantic relationship being greater than a spoken user input semantic threshold value; and decreasing the likelihood score in response to the value of the semantic relationship being less than the spoken user input semantic threshold value.

64. The system of claim 37, wherein the contextual information comprises an identification of a speaker of the first spoken user input.

65. The system of claim 37, wherein the contextual information comprises an indication of whether the electronic device was outputting information to the user when the first spoken user input was received, and wherein calculating the likelihood score that the virtual assistant should provide the audible response to the first spoken user input based on contextual information comprises:

increasing the likelihood score in response to the indication indicating that the electronic device was outputting information to the user when the first spoken user input was received; and decreasing the likelihood score in response to the indication indicating that the electronic device was not outputting information to the user when the first spoken user input was received.

66. The system of claim 37, wherein the contextual information comprises an indication of whether the electronic device is being held when the first spoken user input was received, and wherein calculating the likelihood score that the virtual assistant should provide the audible response to the first spoken user input based on contextual information comprises:

increasing the likelihood score in response to the indication indicating that the electronic device was being held when the first spoken user input was received; and decreasing the likelihood score in response to the indication indicating that the electronic device was not being held when the first spoken user input was received.

67. The system of claim 37, wherein the contextual information comprises a previous action performed by the electronic device, and wherein calculating the likelihood score that the virtual assistant should provide the audible response to the first spoken user input based on contextual information comprises:

increasing the likelihood score in response to the previous action performed by the electronic device being one of a set of predetermined actions; and decreasing the likelihood score in response to the previous action performed by the electronic device not being one of the set of predetermined actions.

68. The system of claim 37, wherein the contextual information comprises an indication of whether content was being displayed by the electronic device when the first spoken user input was received, and wherein calculating the likelihood score that the virtual assistant should provide the audible response to the first spoken user input based on contextual information comprises increasing the likelihood score in response to the indication indicating that content was being displayed by the electronic device when the first spoken user input was received.

69. The system of claim 37, wherein the contextual information comprises a semantic relationship between the first spoken user input and content being displayed by the electronic device when the first spoken user input was received, and wherein calculating the likelihood score that the virtual assistant should provide the audible response to the first spoken user input based on contextual information comprises:

increasing the likelihood score in response to a value of the semantic relationship being greater than a content semantic threshold value; and decreasing the likelihood score in response to the value of the semantic relationship being less than the content semantic threshold value.

70. The system of claim 37, wherein the contextual information comprises a position of the user when the first spoken user input was received, and wherein calculating the likelihood score that the virtual assistant should provide the audible response to the first spoken user input based on contextual information comprises:

increasing the likelihood score in response to the position of the user being one of a predetermined set of positions; and decreasing the likelihood score in response to the position of the user not being one of the predetermined set of positions.

71. The system of claim 37, wherein the contextual information comprises a semantic relationship between the first spoken user input and the previous output of the electronic device, and wherein calculating the likelihood score that the virtual assistant should provide the audible response to the first spoken user input based on contextual information comprises:

increasing the likelihood score in response to a value of the semantic relationship being greater than a previous output semantic threshold value; and decreasing the likelihood score in response to the value of the semantic relationship being less than the previous output semantic threshold value.

72. The system of claim 37, wherein the contextual information comprises a semantic relationship between the first spoken user input an application being run by the electronic device when the first spoken user input was received, and wherein calculating the likelihood score that the virtual assistant should provide the audible response to the first spoken user input device based on contextual information comprises:

increasing the likelihood score in response to a value of the semantic relationship being greater than an application semantic threshold value; and decreasing the likelihood score in response to the value of the semantic relationship being less than the application semantic threshold value.

73. The system of claim 38, wherein the contextual information comprises a movement of the electronic device, and wherein calculating the likelihood score that the virtual assistant should provide the audible response to the first spoken user input based on contextual information comprises:

increasing the likelihood score in response to the movement being one of a predetermined set of movements; and decreasing the likelihood score in response to the movement not being one of the predetermined set of movements.

* * * * *

UNITED STATES PATENT AND TRADEMARK OFFICE
CERTIFICATE OF CORRECTION

| | |
|---|---|
| PATENT NO. | : 10,373,617 B2 |
| APPLICATION NO. | : 15/656793 |
| DATED | : August 6, 2019 |
| INVENTOR(S) | : Philippe P. Piernot et al. |

Page 1 of 1

It is certified that error appears in the above-identified patent and that said Letters Patent is hereby corrected as shown below:

In the Claims

In Column 50, Line 51, Claim 73, delete "claim 38," and insert -- claim 37, --, therefor.

Signed and Sealed this
Twenty-fourth Day of December, 2019

Andrei Iancu
*Director of the United States Patent and Trademark Office*